US012670148B1

(12) United States Patent
Neels et al.

(10) Patent No.: US 12,670,148 B1
(45) Date of Patent: Jun. 30, 2026

(54) DATA MODEL SELECTION AND APPLICATION BASED ON DATA SOURCES

(71) Applicant: Cisco Technology, Inc., San Jose, CA (US)

(72) Inventors: Alice Emily Neels, San Francisco, CA (US); Archana Sulochana Ganapathi, San Francisco, CA (US); Marc Vincent Robichaud, San Francisco, CA (US); Stephen Phillip Sorkin, San Francisco, CA (US); Steve Yu Zhang, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/434,485

(22) Filed: Feb. 6, 2024

Related U.S. Application Data

(63) Continuation of application No. 17/734,786, filed on May 2, 2022, now Pat. No. 11,893,010, which is a
(Continued)

(51) Int. Cl.
*G06F 16/242* (2019.01)
*G06F 3/0482* (2013.01)
(Continued)

(52) U.S. Cl.
CPC ........ *G06F 16/2425* (2019.01); *G06F 3/0482* (2013.01); *G06F 16/245* (2019.01);
(Continued)

(58) Field of Classification Search
CPC .. G06F 16/2425; G06F 3/0482; G06F 16/245; G06F 16/24575; G06F 16/248; G06F 16/27; G06F 16/9535; G06F 40/186
(Continued)

(56) References Cited

U.S. PATENT DOCUMENTS 5,550,971 A 8/1996 Brunner et al.
5,999,933 A 12/1999 Mehta
(Continued)

OTHER PUBLICATIONS

Carraso, David, "Exploring Splunk," published by CITO Research, New York, NY, Apr. 2012, 156 pages.
(Continued)

*Primary Examiner* — Phong H Nguyen
(74) *Attorney, Agent, or Firm* — Shook, Hardy & Bacon L.L.P.

(57) ABSTRACT

Embodiments include generating data models that may give semantic meaning for unstructured or structured data that may include data generated and/or received by search engines, including a time series engine. A method includes generating a data model for data stored in a repository. Generating the data model includes generating an initial query string, executing the initial query string on the data, generating an initial result set based on the initial query string being executed on the data, determining one or more candidate fields from one or results of the initial result set, generating a candidate data model based on the one or more candidate fields, iteratively modifying the candidate data model until the candidate data model models the data, and using the candidate data model as the data model.

18 Claims, 22 Drawing Sheets

Related U.S. Application Data continuation of application No. 16/204,989, filed on Nov. 29, 2018, now Pat. No. 11,321,311, which is a continuation of application No. 15/421,415, filed on Jan. 31, 2017, now Pat. No. 10,169,405, which is a continuation of application No. 14/815,884, filed on Jul. 31, 2015, now Pat. No. 9,589,012, which is a continuation of application No. 14/611,232, filed on Jan. 31, 2015, now Pat. No. 9,128,980, which is a continuation of application No. 14/067,203, filed on Oct. 30, 2013, now Pat. No. 8,983,994, which is a continuation of application No. 13/607,117, filed on Sep. 7, 2012, now Pat. No. 8,788,525.

(51) Int. Cl.
*G06F 16/245* (2019.01)
*G06F 16/2457* (2019.01)
*G06F 16/248* (2019.01)
*G06F 16/27* (2019.01)
*G06F 16/9535* (2019.01)
*G06F 40/186* (2020.01)

(52) U.S. Cl.
CPC ...... *G06F 16/24575* (2019.01); *G06F 16/248* (2019.01); *G06F 16/27* (2019.01); *G06F 16/9535* (2019.01); *G06F 40/186* (2020.01)

(58) Field of Classification Search
USPC ................ 707/722, 736, 737, 769, 779, 805
See application file for complete search history.

(56) References Cited

U.S. PATENT DOCUMENTS 6,205,498 B1 3/2001 Habusha et al.
6,208,638 B1 3/2001 Rieley et al.
6,484,162 B1 11/2002 Edlund et al.
6,650,346 B1 11/2003 Jaeger et al.
6,704,688 B2 3/2004 Aslam et al.
7,076,482 B2 7/2006 Bellew
7,529,642 B2 5/2009 Raymond
7,562,069 B1 7/2009 Chowdhury et al.
7,640,496 B1 * 12/2009 Chaulk ............... H04L 67/1097 715/204
7,937,344 B2 5/2011 Baum et al.
8,031,634 B1 10/2011 Artzi et al.
8,112,425 B2 2/2012 Baum et al.
8,380,698 B2 2/2013 Sundaranatha
8,412,696 B2 4/2013 Zhang et al.
8,422,786 B2 4/2013 Chenthamarakshan et al.
8,442,982 B2 5/2013 Jacobson et al.
8,516,008 B1 8/2013 Marquardt et al.
8,548,973 B1 10/2013 Kritt et al.
8,589,403 B2 11/2013 Marquardt et al.
8,682,925 B1 3/2014 Marquardt et al.
8,700,658 B2 4/2014 Rambhia et al.
8,707,194 B1 4/2014 Jenkins et al.
8,713,000 B1 4/2014 Elman et al.
8,725,756 B1 5/2014 Garg et al.
8,751,486 B1 6/2014 Neeman et al.
8,751,529 B2 6/2014 Zhang et al.
8,770,658 B2 7/2014 Grimm et al.
8,788,525 B2 7/2014 Neels et al.
8,788,526 B2 7/2014 Neels et al.
8,868,591 B1 10/2014 Finkelstein et al.
8,910,084 B2 12/2014 Helfman et al.
8,983,994 B2 3/2015 Neels et al.
9,098,497 B1 * 8/2015 Brette ................ G06F 16/2428
9,215,240 B2 12/2015 Merza et al.
9,286,413 B1 3/2016 Coates et al.
9,509,765 B2 11/2016 Pal et al.
9,569,511 B2 2/2017 Morin
10,127,258 B2 11/2018 Lamas et al.
2001/0018689 A1 8/2001 Spence et al.
2001/0023414 A1 9/2001 Kumar et al.
2001/0048374 A1 12/2001 Blad
2002/0054101 A1 5/2002 Beatty
2002/0181496 A1 12/2002 Narasimhan et al.
2003/0131215 A1 7/2003 Bellew
2003/0163463 A1 8/2003 Cain
2003/0187821 A1 10/2003 Cotton et al.
2003/0197743 A1 * 10/2003 Hill ..................... G06Q 10/063 715/853
2004/0078359 A1 4/2004 Bolognese et al.
2004/0111410 A1 6/2004 Burgoon et al.
2004/0181526 A1 9/2004 Burdick et al.
2004/0186826 A1 9/2004 Choi et al.
2004/0220965 A1 11/2004 Harville et al.
2004/0221226 A1 11/2004 Lin et al.
2004/0225641 A1 11/2004 Dettinger et al.
2004/0254919 A1 12/2004 Giuseppini
2004/0267770 A1 12/2004 Lee
2005/0015363 A1 1/2005 Dessloch et al.
2005/0050540 A1 3/2005 Shaughnessy et al.
2005/0182703 A1 8/2005 D'hers et al.
2005/0192921 A1 * 9/2005 Chaudhuri .......... G06F 16/2358 707/999.001
2005/0203876 A1 9/2005 Cragun et al.
2005/0234894 A1 10/2005 Tenazas
2006/0004826 A1 1/2006 Zartler et al.
2006/0026145 A1 2/2006 Beringer et al.
2006/0041539 A1 2/2006 Matchett et al.
2006/0048101 A1 3/2006 Krassovsky et al.
2006/0053174 A1 3/2006 Gardner et al.
2006/0074621 A1 4/2006 Rachman
2006/0106763 A1 5/2006 Dirisala
2006/0112123 A1 5/2006 Clark et al.
2006/0123010 A1 6/2006 Landry et al.
2006/0136470 A1 * 6/2006 Dettinger ............ G06F 16/2471 707/999.102
2006/0143159 A1 6/2006 Chowdhury et al.
2006/0148550 A1 7/2006 Nee, Jr. et al.
2006/0161816 A1 7/2006 Gula et al.
2006/0206454 A1 9/2006 Forstall et al.
2006/0248087 A1 11/2006 Agrawal et al.
2006/0253423 A1 11/2006 McLane et al.
2006/0259474 A1 11/2006 Granito
2006/0293979 A1 12/2006 Cash et al.
2007/0073743 A1 3/2007 Bammi et al.
2007/0078822 A1 * 4/2007 Cucerzan .............. G06F 16/951 707/999.003
2007/0078872 A1 4/2007 Cohen
2007/0112733 A1 5/2007 Beyer et al.
2007/0118491 A1 5/2007 Baum et al.
2007/0130111 A1 * 6/2007 Stoudt .................... G06Q 10/10 707/999.002
2007/0198501 A1 8/2007 Sundaranatha
2007/0209080 A1 9/2007 Ture et al.
2007/0214164 A1 9/2007 MacLennan et al.
2007/0259709 A1 11/2007 Kelly et al.
2008/0059420 A1 3/2008 Hsu et al.
2008/0091690 A1 * 4/2008 Ellersick ................... G06F 8/10 707/999.1
2008/0104542 A1 5/2008 Cohen et al.
2008/0184110 A1 7/2008 Barsness et al.
2008/0215546 A1 9/2008 Baum et al.
2008/0222125 A1 9/2008 Chowdhury et al.
2008/0228743 A1 9/2008 Kusnitz et al.
2008/0270366 A1 10/2008 Frank
2008/0301095 A1 12/2008 Zhu et al.
2008/0319965 A1 12/2008 Dettinger et al.
2009/0013281 A1 1/2009 Helfman et al.
2009/0019020 A1 1/2009 Dhillon et al.
2009/0055370 A1 2/2009 Dagum et al.
2009/0069739 A1 3/2009 Mohamed
2009/0085769 A1 4/2009 Thubert et al.
2009/0094521 A1 * 4/2009 Hung .................. H04L 41/0846 715/736
2009/0125546 A1 5/2009 Iborra et al.
2009/0182866 A1 7/2009 Watanabe et al.
2009/0300065 A1 12/2009 Birchall
2009/0319512 A1 12/2009 Baker et al.

(56) References Cited

U.S. PATENT DOCUMENTS

2009/0326924 A1 12/2009 Crider et al.
2009/0327319 A1 12/2009 Bertram et al.
2010/0095018 A1 4/2010 Khemani et al.
2010/0100562 A1 4/2010 Millsap
2010/0161677 A1 6/2010 Zurek et al.
2010/0182321 A1 7/2010 Cartan
2010/0251100 A1 9/2010 Delacourt
2010/0275024 A1 10/2010 Abdulhayoglu
2010/0290617 A1 11/2010 Nath
2010/0299135 A1 11/2010 Fritsch et al.
2010/0306281 A1 12/2010 Williamson
2010/0332661 A1 12/2010 Tameshige
2011/0066585 A1 3/2011 Subrahmanyam et al.
2011/0082884 A1 4/2011 Hollingsworth
2011/0154296 A1 6/2011 Marenco
2011/0191373 A1 8/2011 Botros et al.
2011/0196851 A1 8/2011 Vadlamani et al.
2011/0218978 A1 9/2011 Hong et al.
2011/0235909 A1* 9/2011 Chenthamarakshan .................... G06V 30/40 382/173
2011/0307905 A1 12/2011 Essey et al.
2011/0320459 A1 12/2011 Chisholm
2012/0079363 A1 3/2012 Folting et al.
2012/0117116 A1 5/2012 Jacobson et al.
2012/0120078 A1 5/2012 Hubbard
2012/0124503 A1 5/2012 Coimbatore et al.
2012/0159370 A1 6/2012 Rode et al.
2012/0185441 A1 7/2012 Sankar et al.
2012/0278336 A1 11/2012 Malik et al.
2012/0283948 A1 11/2012 Demiryurek et al.
2012/0284713 A1 11/2012 Ostermeyer et al.
2012/0296876 A1 11/2012 Bacinschi et al.
2012/0296878 A1 11/2012 Nakae et al.
2012/0324448 A1 12/2012 Huetter et al.
2013/0041824 A1 2/2013 Gupta
2013/0047270 A1 2/2013 Lowery et al.
2013/0054642 A1* 2/2013 Morin ................... G06F 16/258 707/E17.014
2013/0060912 A1 3/2013 Rensin et al.
2013/0073957 A1 3/2013 Digiantomasso et al.
2013/0080190 A1 3/2013 Mansour et al.
2013/0247133 A1 9/2013 Price et al.
2013/0262371 A1 10/2013 Nolan
2013/0311438 A1 11/2013 Marquardt et al.
2013/0318236 A1 11/2013 Coates et al.
2013/0318603 A1 11/2013 Merza
2013/0325840 A1* 12/2013 Kritt ................... G06F 16/9535 707/E17.082
2013/0325893 A1 12/2013 Asay et al.
2013/0326620 A1 12/2013 Merza et al.
2014/0019448 A1 1/2014 Leonard et al.
2014/0019909 A1 1/2014 Leonard et al.
2014/0046976 A1 2/2014 Zhang et al.
2014/0074591 A1* 3/2014 Allen ................. G06Q 30/0244 705/14.43
2014/0074887 A1 3/2014 Neels et al.
2014/0074889 A1 3/2014 Neels et al.
2014/0160238 A1 6/2014 Mm et al.
2014/0236889 A1 8/2014 Vasan et al.
2014/0236890 A1 8/2014 Vasan et al.
2014/0280894 A1 9/2014 Reynolds et al.
2014/0324862 A1 10/2014 Bingham et al.
2015/0019537 A1 1/2015 Neels et al.
2015/0026167 A1 1/2015 Neels et al.
2015/0169736 A1 6/2015 MacPherson et al.
2015/0278153 A1 10/2015 Leonard et al.
2015/0339344 A1 11/2015 Neels et al.
2016/0140743 A1 5/2016 Neels et al.
2016/0217599 A1 7/2016 Neels et al.
2016/0246495 A1 8/2016 Neels et al.
2016/0321369 A1 11/2016 Neels et al.
2019/0095062 A1 3/2019 Neels et al.
2019/0098106 A1 3/2019 Mungel et al.

OTHER PUBLICATIONS

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.
http://docs.splunk.com/Documentation/PCI/2.1.1/ [000119] User/IncidentReviewdashboard, Last accessed, Aug. 5, 2014, 2 pages.
vSphere Monitoring and Performance, VMware, Inc., Update 1, vSphere 5.5, EN-001357-02, http://pubs. vmware .com/ vsphere-55/topic/com. vmware.ICbase/PDF/ vsphere-esxi-vcenter- server-551-mon itoring-performance-guide.pdf, 2010-2014, pp. 1-174.
Manning, Christopher D., "Introduction to Information Retrieval", Cambridge University Press, Chapter 1, May 27, 2008, 504 pages.
Cohen et al., "MAD Skills: New Analysis Practices For Big Data", Aug. 28, 2009, Proceedings of the VLDB Endowment, vol. 2, No. 2, Aug. 2009, pp. 1481-1492.
Splunk Enterprise 8.0.0 Overview, available online, retrieved on May 20, 2020 from docs.splunk.com, 17 pages.
Splunk Cloud 8.0.2004 User Manual, available online, retrieved on May 20, 2020 from docs.splunk.com, 66 pages.
Splunk Quick Reference Guide, updated 2019, available online at https://www.splunk.com/pdfs/solution-guides/splunk-quick-reference-guide.pdf, retrieved on May 20, 2020, 6 pages.

* cited by examiner

524 → 127.0.0.1 - - [10/Apr/2007:10:53:10 +0300] "GET / HTTP/1.1" 500 612 "splunk.com" "Mozilla/5.0 (X11; U; Linux i686; en-US; rv:1.8.1.3) Gecko/20061201 Firefox/2.0.0.3 (Ubuntu-feisty)"

*900*

START

DETERMINE DATA MODEL    *902*

DETERMINE SEARCH OBJECTS BASED ON DATA MODEL AND REPORT TEMPLATE    *904*

GENERATE QUERY STRING BASED ON SEARCH OBJECTS AND DATA MODEL    *906*

EXECUTE QUERY STRING ON DATA REPOSITORY TO PRODUCE QUERY RESULT SET    *908*

MAP QUERY RESULT SET TO DATA MODEL OBJECTS    *910*

GENERATE REPORT FROM DATA MODEL OBJECTS    *912*

RETURN

*1000*

START

DETERMINE DATA MODEL OBJECT NAME ⌇*1002*

DETERMINE PARENT DATA MODEL OBJECT (IF ANY) ⌇*1004*

DETERMINE FIELDS FOR DATA MODEL OBJECT ⌇*1006*

DETERMINE OBJECT LEVEL CONSTRAINTS, FILTERS, EVALS, AND BEHAVIORS FOR DATA MODEL OBJECT ⌇*1008*

CREATE MORE OBJECTS? ⌇*1010*

YES

NO

RETURN

*1300*

START

GENERATE QUERY STRING AND EXECUTE
ON DATA REPOSITORY                          *1302*

DETERMINE CANDIDATE FIELDS BASED ON
RESULT SET                                  *1304*

GROUP FIELDS BASED ON COMMON FIELD
AVAILABILITY                                *1306*

GENERATE CANDIDATE DATA MODEL
BASED ON DATA MODEL OBJECTS AND             *1308*
CANDIDATE FIELDS

ITERATIVELY MODIFY CANDIDATE DATA
MODEL AND CANDIDATE DATA MODEL              *1310*
OBJECTS UNTIL MODEL IS ACCEPTED

RETURN

1400

START

RECEIVE SEARCH OBJECT(S) FOR DATA MODEL BASED REPORT ~ 1402

DETERMINE ROOT DATA MODEL OBJECT AND TARGET DATA MODEL OBJECT(S) BASED ON SEARCH OBJECTS ~ 1404

TRAVERSE DATA MODEL OBJECT PATH IN DATA MODEL ~ 1406

GENERATE QUERY STRING FRAGMENT BASED ON CURRENT OBJECT ~ 1408

TARGET OBJECT REACHED? ~ 1410

NO

YES

ASSOCIATE GENERATED QUERY STRING WITH TARGET OBJECT ~ 1412

RETURN

*1500*

START

DETERMINE DATA MODEL   *1502*

SELECT FIELDS FROM DATA MODEL OBJECT
TO ADD TO PIVOT REPORT   *1504*

DETERMINE CALCULATIONS FOR PIVOT
REPORT CELLS   *1506*

NO

PIVOT REPORT
COMPLETE?   *1508*

YES

STORE PIVOT REPORT TEMPLATE   *1510*

RETURN

*1600*

START

GENERATE QUERY STRING BASED ON PIVOT REPORT TEMPLATE AND DATA MODEL ~*1602*

EXECUTE QUERY STRING ON DATA REPOSITORY TO PRODUCE QUERY RESULT SET ~*1604*

MAP QUERY RESULT SET TO ROW AND COLUMNS IN PIVOT REPORT TEMPLATE ~*1606*

GENERATE PIVOT REPORT FROM PIVOT REPORT TEMPLATE ~*1608*

RETURN

Figure 20:
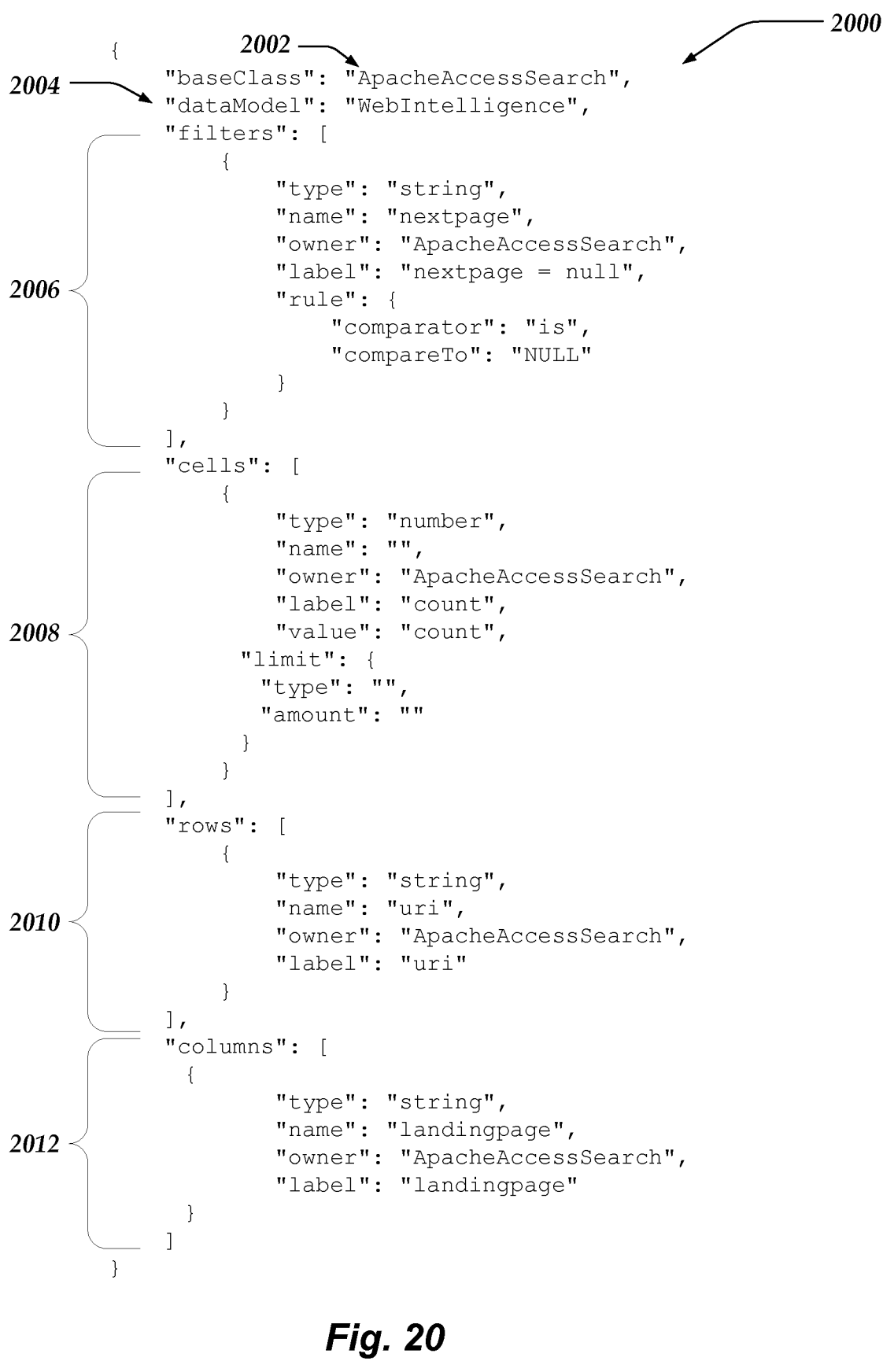

2000

```
{
    "baseClass": "ApacheAccessSearch",
    "dataModel": "WebIntelligence",
    "filters": [
        {
            "type": "string",
            "name": "nextpage",
            "owner": "ApacheAccessSearch",
            "label": "nextpage = null",
            "rule": {
                "comparator": "is",
                "compareTo": "NULL"
            }
        }
    ],
    "cells": [
        {
            "type": "number",
            "name": "",
            "owner": "ApacheAccessSearch",
            "label": "count",
            "value": "count",
          "limit": {
            "type": "",
            "amount": ""
          }
        }
    ],
    "rows": [
        {
            "type": "string",
            "name": "uri",
            "owner": "ApacheAccessSearch",
            "label": "uri"
        }
    ],
    "columns": [
      {
            "type": "string",
            "name": "landingpage",
            "owner": "ApacheAccessSearch",
            "label": "landingpage"
      }
    ]
}
```

2102
```
class HTTP_Request(Event):
    def __init__(self):
        Event.__init__(self)
      self.name = 'HTTP_Request'
        self.fields = self.fields +
[Field("uri", [], owner=self.name,
required=True),
            Field("status", ['<600'],
type='number', owner=self.name,
required=True),
            Field("clientip", [],
type='string', owner=self.name,
required=True),
            Field("referer", [],
owner=self.name, required=True),
            Field("useragent", [],
owner=self.name, required=True)]
```

2104
```
class HTTP_Success(HTTP_Request):
    def __init__(self):
      HTTP_Request.__init__(self)
      self.name='HTTP_Success'
      self.constrainField("status = 2*")
```

2106
```
class HTTP_Error(HTTP_Request):
    def __init__(self):
      HTTP_Request.__init__(self)
      self.name='HTTP_Error'
      self.constrainField("status != 2*")
      self.constrainField("status != 3*")
```

2108
```
class HTTP_Redirect(HTTP_Request):
    def __init__(self):
      HTTP_Request.__init__(self)
      self.name='HTTP_Redirect'
      self.constrainField("status = 3*")
```

2110
```
class Pageview(HTTP_Success):
    def __init__(self):
      HTTP_Success.__init__(self)
      self.name = 'Pageview'
      self.constrainFieldValueList("uri_path
",
['=*.php','=*.html','=*.shtml','=*.rhtml','
=*.asp'])
```

*Fig. 21*

DATA MODEL SELECTION AND APPLICATION BASED ON DATA SOURCES

CROSS-REFERENCE TO RELATED APPLICATIONS

This application is a continuation of application title, "DATA MODEL SELECTION AND APPLICATION BASED ON DATA SOURCES" filed on May 2, 2022 and having Ser. No. 17/734,786, now U.S. Pat. No. 11,893,010, which is a continuation of application title, "DATA MODEL SELECTION AND APPLICATION BASED ON DATA SOURCES," filed on Nov. 29, 2018 and having a Ser. No. 16/204,989, now U.S. Pat. No. 11,321,311, which is a continuation of U.S. patent application titled, "DATA MODEL SELECTION AND APPLICATION BASED ON DATA SOURCES," filed on Jan. 31, 2017 and having Ser. No. 15/421,415, now U.S. Pat. No. 10,169,405, which is a continuation of U.S. patent application titled, "GENERATION OF A DATA MODEL APPLIED TO OBJECT QUERIES," filed on Jul. 31, 2015, having Ser. No. 14/815,884, now U.S. Pat. No. 9,589,012, which is a continuation of U.S. patent application titled, "GENERATION OF A DATA MODEL APPLIED TO QUERIES," filed on Jan. 31, 2015, having Ser. No. 14/611,232, now U.S. Pat. No. 9,128,980, which is a continuation of U.S. patent application titled, "GENERATION OF A DATA MODEL FOR SEARCHING MACHINE DATA," filed Oct. 30, 2013, having Ser. No. 14/067,203, now U.S. Pat. No. 8,983,994, which is a continuation of U.S. patent application titled, "DATA MODEL FOR MACHINE DATA FOR SEMANTIC SEARCH," filed Sep. 7, 2012, having Ser. No. 13/607,117, now U.S. Pat. No. 8,788,525. The subject matter of these related applications is hereby incorporated herein by reference.

BACKGROUND OF THE INVENTION

This invention relates generally to information organization, data modeling, search, and retrieval and more particularly, the generating and utilizing data models in search, and retrieval of search engine data.

The rapid increase in the production and collection of machine generated data has created relatively large data sets that are difficult to search. The machine data can include sequences of time stamped records that may occur in one or more usually continuous streams. Further, machine data often represents some type of activity made up of discrete events.

Often, searching large data sets requires different ways to express search criteria. Search tools today typical allow users to search by the most frequently occurring terms or keywords within the data and generally have little notion of event based searching. Given the large volume and typically repetitive characteristics of machine data, users often need to start by narrowing the set of potential search results using event-based search mechanisms and then, through examination of the results, choose one or more keywords to add to their search parameters. Timeframes and event-based metadata like frequency, distribution, and likelihood of occurrence are especially important when searching data, but can be difficult to achieve with current search tools.

Also, users often generate ad-hoc queries to produce results from data repositories. In some cases, generating queries sufficient for retrieving the desired results may require an undesirably high-level of knowledge about the data domain and/or the operation/structure of the data repository. Thus, systems related to the searching of relatively large sets of data are the subject of considerable innovation.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein:

FIG. 20 includes a code listing of a data model object that implements at least a portion of a pivot report model, in accordance with at least one of the various embodiments; and FIG. 21 includes a code listing of a portion of a data model in accordance with at least one of the various embodiments.

DETAILED DESCRIPTION OF THE PREFERRED EMBODIMENTS

Figure 1:
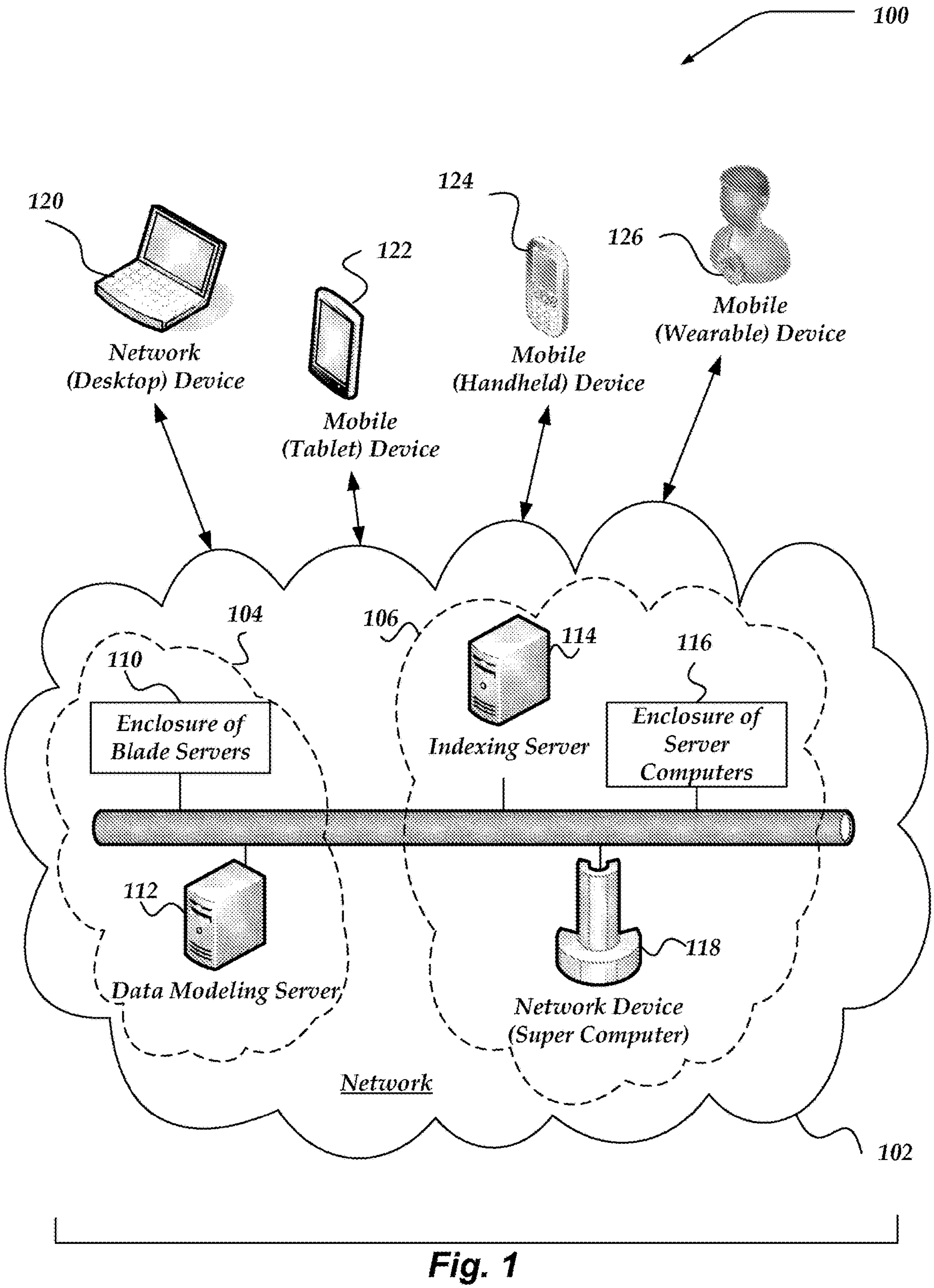
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include server logs and other types of machine data (i.e., data generated by machines). In at least one of the various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second.

The term "time series data" as used herein is data where each data record has a timestamp associated with it. A "Time Series Search Engine" is a search engine which, in at least one of the various embodiments, can perform queries on the stored data limited by a time range (such as between one time and another, or data earlier than a given time, or the like) and/or generates results ordered by time and/or timestamps (such as from earliest-to-latest or vice versa).

The term "data repository" as used herein refers to data sources that may contain unstructured or structured data, such as databases, file systems, search engine indexes, or the like. In at least one of the various embodiments, data repository may be a live stream of data. In other cases, data repository may be static data, or combination of live data or static data. In at least one of the various embodiments, data repositories may provide interfaces and/or application programming interfaces (API) for receiving requests, queries, or searches regarding the data stored in the data repository.

The term "query string" as used herein refers to commands and/or sequences of commands that are used for querying, searching and/or retrieving data from a data repository. Queries generally produce a result or results based on the form and structure of the particular query string. Query results may be sorted and grouped based on the structure and form of the query string. In at least one of the various embodiments, query strings may include operators and functions for calculating values based on the stored records, including functions that produce result sets that may include statistics and metrics about the data stored in data repository. Structured Query Language (SQL) is a well-known query language often used to form queries for relational databases. However, the various embodiments are not limited to using SQL-like formatting for query strings. Accordingly, other well-known query languages and/or custom query languages may be employed consistent with what is claimed herein.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards generating data models that may at least define semantic meaning for modeling unstructured data and/or structured data that may be stored in a data repository. In at least one of the various embodiments, unstructured data may include data generated and/or received by search engines, including a time series search engine. Also, in at least one of the various embodiments, unstructured data may be received and/or stored absent pre-defined data schemas or formats. In at least one of the various embodiments, data models also may be generated to provide at least semantic meaning to structured data that may be stored in Structured Query Language (SQL) databases, Extensible Markup Language (XML) files, or the like.

In at least one of the various embodiments, the data model may be determined such that it at least provides semantic meaning to unstructured data. In at least one of the various embodiments, data models may be generated to provide at least semantic meaning to unstructured data without creating a static database schema. Further, in at least one of the various embodiments, one or more data models may be generated such that the organization of the unstructured may remain unmodified. Thus, data models, in at least one of the various embodiments, may provide semantic meaning to unstructured data without modifying the unstructured data (e.g., no side-effects).

In at least one of the various embodiments, a data model may be composed of one or more data model objects. In at least one of the various embodiments, data model objects may have a hierarchy analogous to an object-oriented programming class hierarchy. Further, in at least one of the various embodiments, data model objects may include fields, filters, constraints, or the like, that correspond to the data the data model object represents.

In at least one of the various embodiments, users may employ a data modeling application to produce a report using search objects that may be part of, or associated with the data model. The data modeling application may employ the search objects and the data model to generate a query string for searching a data repository to produce a result set. In at least one of the various embodiments, the data modeling application may map the result set data to data model objects that may be used to generate reports.

In at least one of the various embodiments, a search object may be an individual data model object selected by a user to generate search results. In this case, a search object may be a data model object selected from among the data model objects that comprise a data model. Also, in at least one of the various embodiments, search objects may be specialized objects that may include one or more data model objects, portions of one or more data model objects, or the like. In some embodiments, search objects may include fields, filters, constraints, that may be separate from those comprising data model objects.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include server data modeling server 112, indexing server 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet mobile device 122, handheld mobile device 124, wearable mobile device 126, desktop network device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a mobile device is described in more detail below in conjunction with FIG. 3. Generally, mobile devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
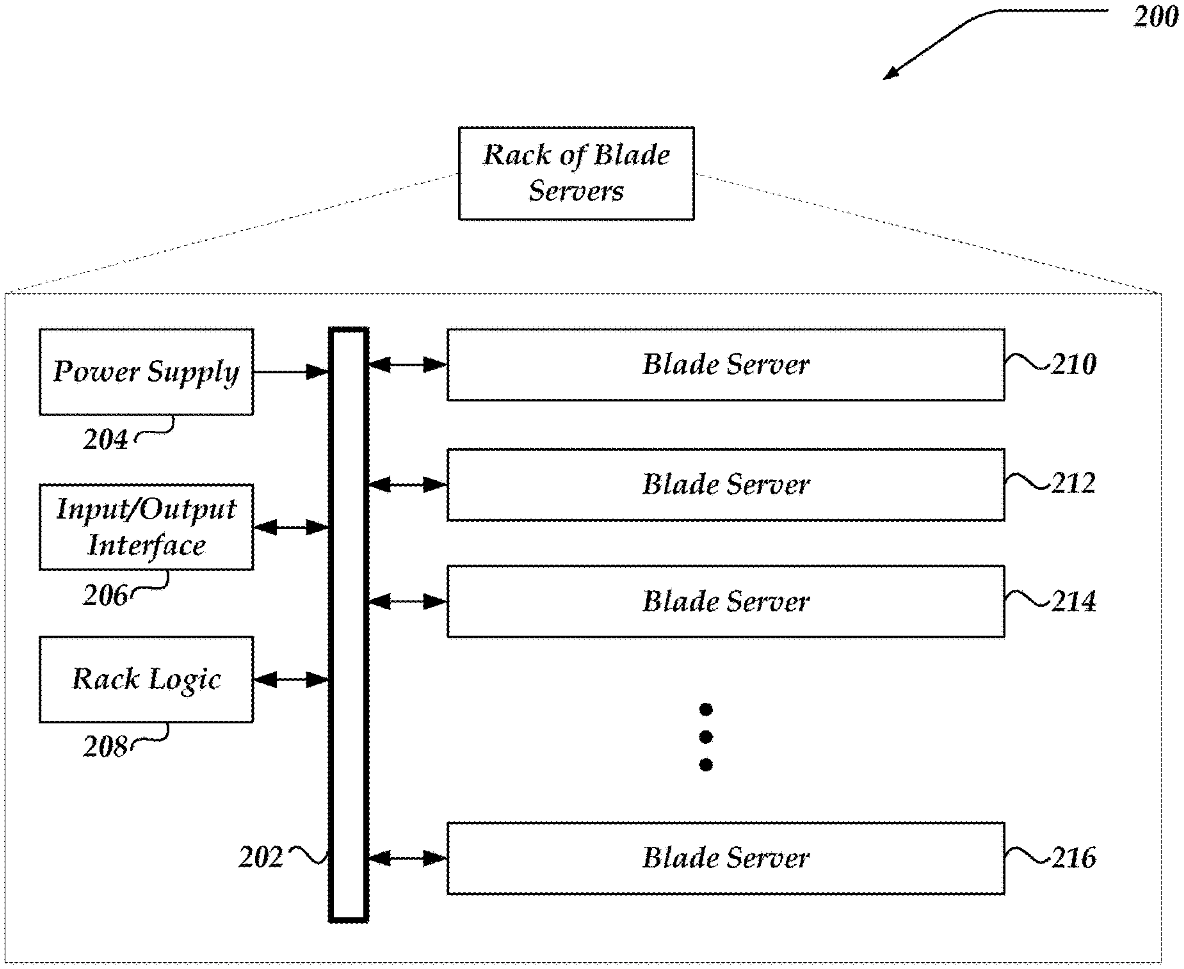
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
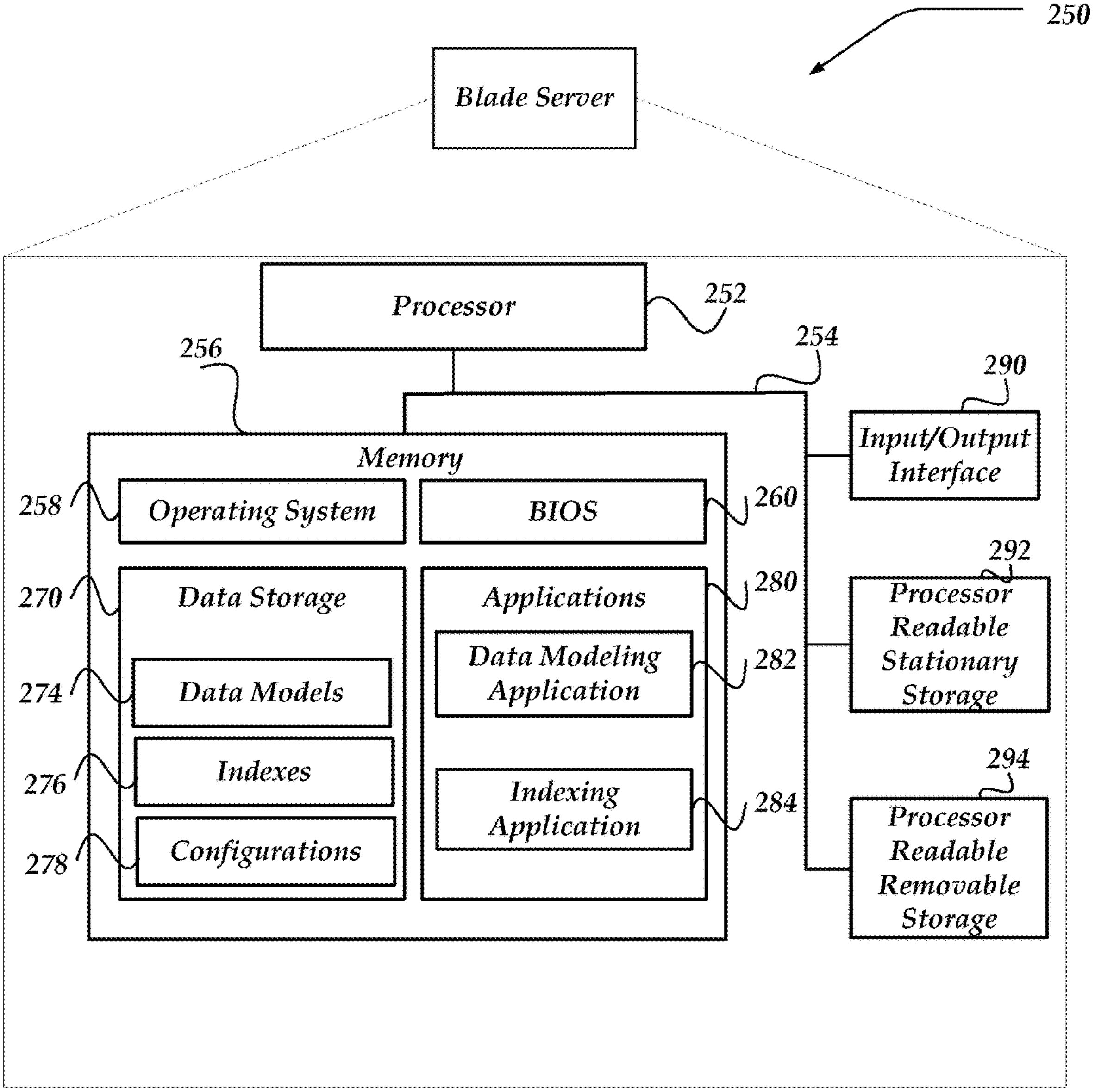
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™ and Apple Computer's IoS Server™, or the like.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, data models 274, indexes 276, or configurations 278.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, data modeling application 282, and indexing application 284.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Mobile Device

Figure 3:
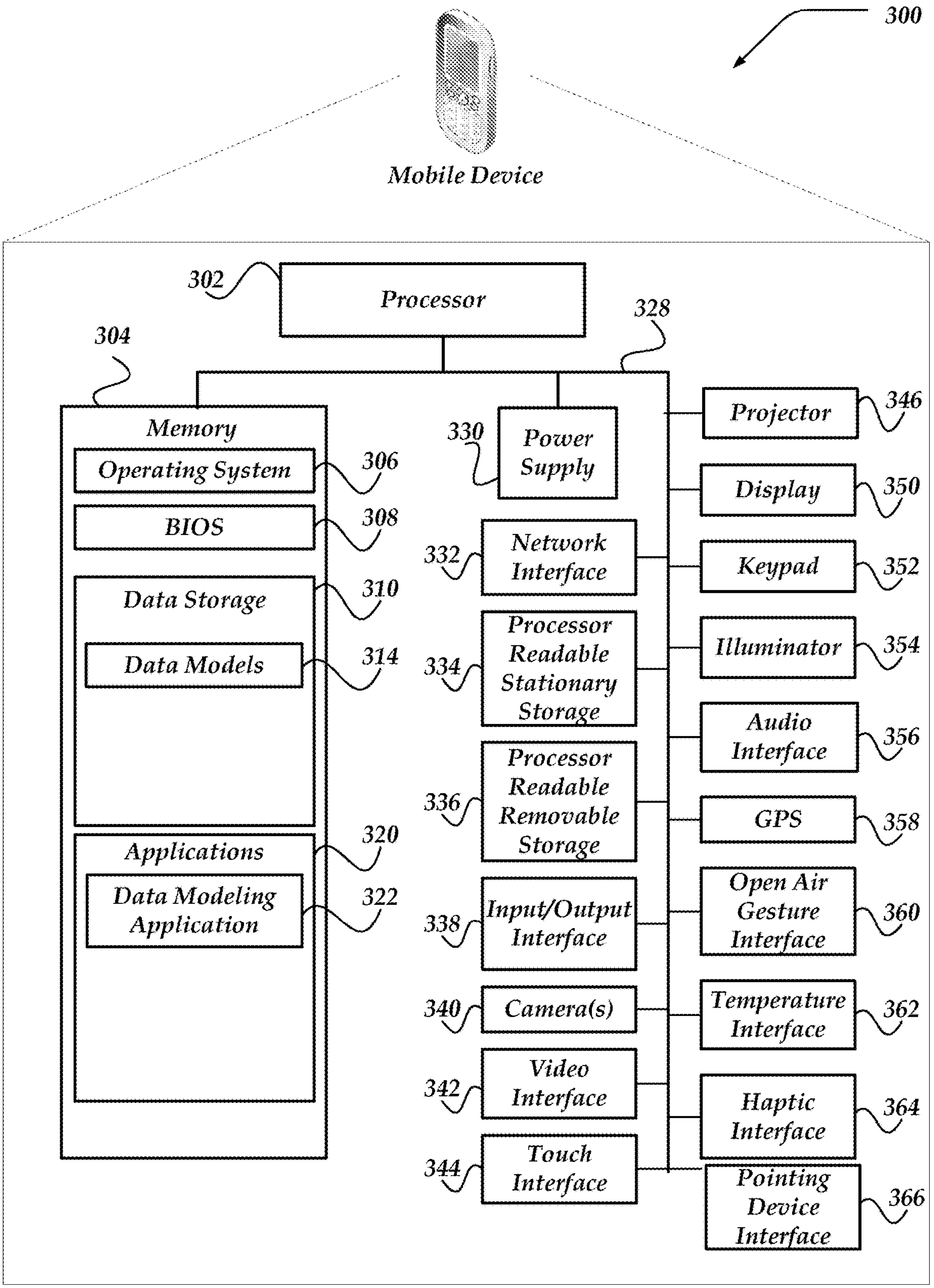
FIG. 3 shows a schematic embodiment of a mobile device.

FIG. 3 shows one embodiment of mobile device 300 that may include many more or less components than those shown. Mobile device 300 may represent, for example, at least one embodiment of mobile devices shown in FIG. 1.

Mobile device 300 includes processor 302 in communication with memory 304 via bus 328. Mobile device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to mobile device 300. A rechargeable or non-rechargeable battery may be used to provide power. The power may also be provided by an external power source, such as an AC adapter or a powered docking cradle that supplements and/or recharges the battery. And in one embodiment, although not shown, a gyroscope may be employed within mobile device 300 to measuring and/or maintaining an orientation of mobile device 300.

Mobile device 300 may optionally communicate with a base station (not shown), or directly with another computing device. Network interface 332 includes circuitry for coupling mobile device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), Web Access Protocol (WAP), ultra wide band (UWB), IEEE 802.16 Worldwide Interoperability for Microwave Access (WiMax), Session Initiation Protocol/Real-time Transport Protocol (SIP/RTP), General Packet Radio Services (GPRS), Enhanced Data GSM Environment (EDGE), Wideband Code Division Multiple Access (WCDMA), Long Term Evolution Advanced (LTE), Universal Mobile Telecommunications System (UMTS), Orthogonal frequency-division multiplexing (OFDM), Code Division Multiple Access 2000 (CDMA2000), Evolution-Data Optimized (EV-DO), High-Speed Downlink Packet Access (HSDPA), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the mobile device is powered. Also, illuminator 354 may backlight these buttons in various patterns when particular actions are performed, such as dialing another mobile device. Illuminator 354 may also cause light sources positioned within a transparent or translucent case of the mobile device to illuminate in response to actions.

Mobile device 300 also comprises input/output interface 338 for communicating with external peripheral devices or other computing devices such as other mobile devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the mobile device. For example, the haptic interface 364 may be employed to vibrate mobile device 300 in a particular way when another user of a computing device is calling. Temperature interface 362 may be used to provide a temperature measurement input and/or a temperature changing output to a user of mobile device 300. Open air gesture interface 360 may sense physical gestures of a user of mobile device 300, for example, by using single or stereo video cameras, radar, a gyroscopic sensor inside a device held or worn by the user, or the like. Camera 340 may be used to track physical eye movements of a user of mobile device 300.

GPS transceiver 358 can determine the physical coordinates of mobile device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 300 on the surface of the Earth. It is understood that under different conditions, GPS transceiver 358 can determine a physical location for mobile device 300. In at least one embodiment, however, mobile device 300 may, through other components, provide other information that may be employed to determine a physical location of the device, including for example, a Media Access Control (MAC) address, IP address, and the like.

Human interface components can be peripheral devices that are physically separate from mobile device 300, allowing for remote input and/or output to mobile device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include a browser application that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of mobile device 300. The memory also stores an operating system 306 for controlling the operation of mobile device 300. It will be appreciated that this component may include a general-purpose operating system such as a version of UNIX, or LINUX™, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by mobile device 300 to store, among other things, applications 320 and/or other data. For example, data storage 310 may also be employed to store information that describes various capabilities of mobile device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile device 300, including, but not limited to, non-transitory processor-readable removable storage device 336, processor-readable stationary storage device 334, or even external to the mobile device. Data storage 310 may include, for example, data models 314.

Applications 320 may include computer executable instructions which, when executed by mobile device 300, transmit, receive, and/or otherwise process instructions and data. Applications 320 may include, for example, data modeling application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
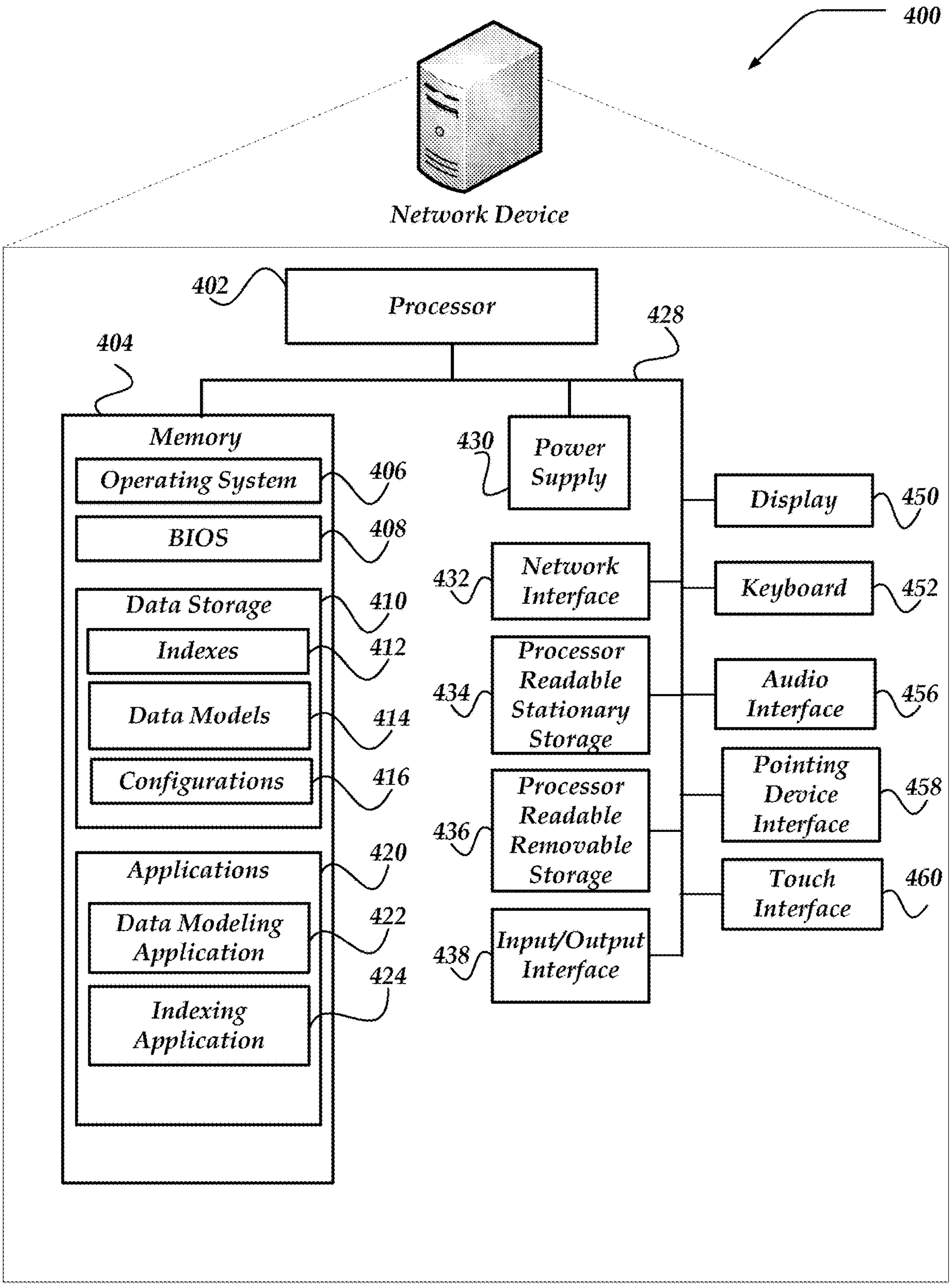
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of data modeling server 112, indexing server 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOs® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, indexes 412, data models 414, and configurations 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, data modeling application 422, and indexing application 424.

Illustrative Data Modeling Architecture

Figure 5:
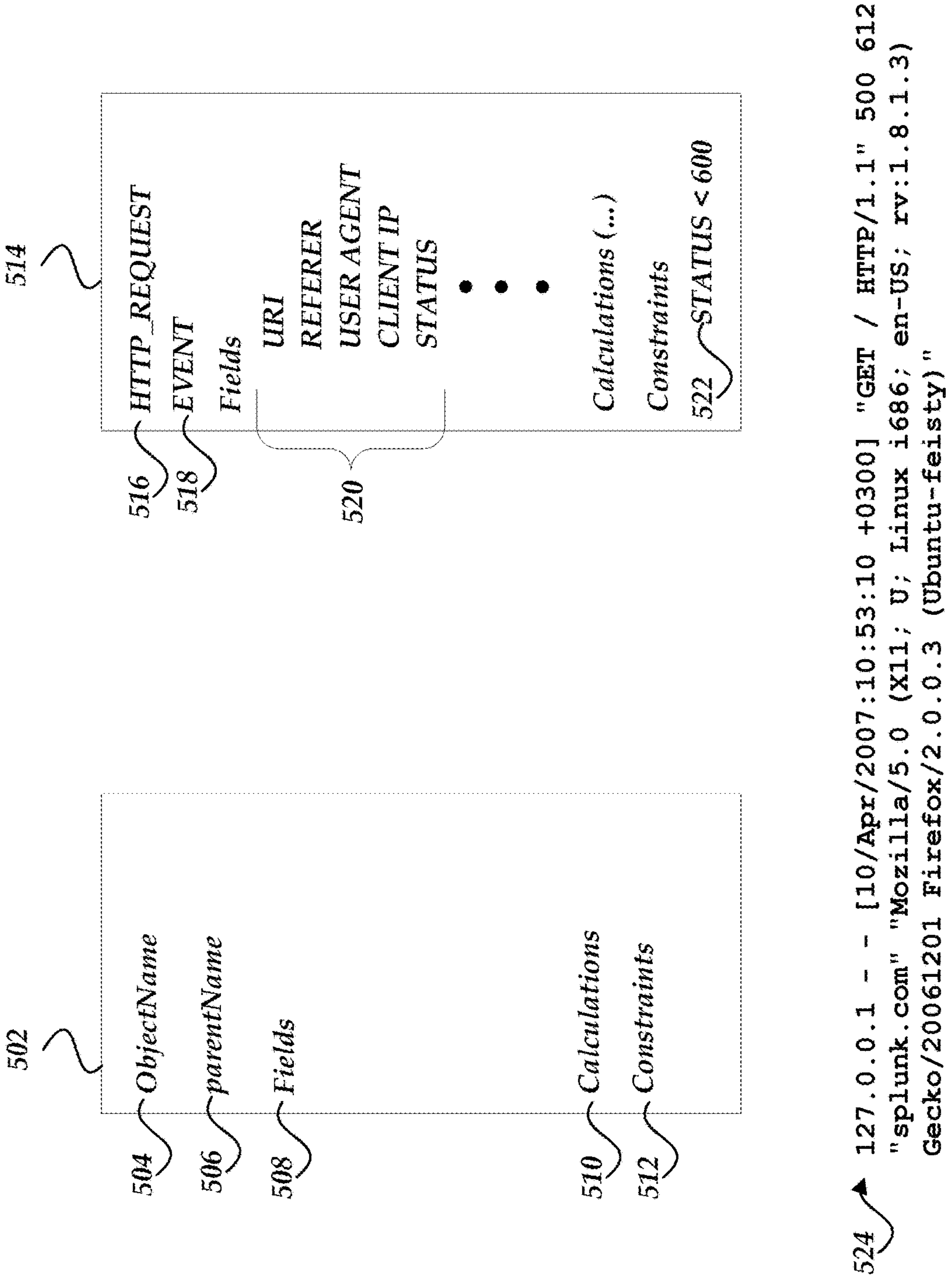
FIG. 5 illustrates for at least one of the various embodiments, a logical structure for data objects that may comprise a data model.

FIGS. 5-8 represents embodiments of a data modeling architecture for at least one of the various embodiments. FIG. 5 illustrates for at least one of the various embodiments, a logical structure for data model objects that may comprise a data model. In at least one of the various embodiments, a data model may be generated by a user. In at least one of the various embodiments, users that generate data models understand the structure of the data as it is stored in the data repository.

In at least one of the various embodiments, if generating a data model, the user may employ data modeling application 422 to systematically encapsulate his or her knowledge of the data enabling data modeling application 422 to provide the data model to other users. In at least one of the various embodiments, these other users may employ the generated data model(s) to generate reports.

In at least one of the various embodiments, a data model may be composed of one or more of data model objects. In at least one of the various embodiments, data model objects may have a hierarchy analogous to an object-oriented programming class hierarchy, and may inherit either from a root object provided by the data modeling application, or another data model object present in the current data model.

In at least one of the various embodiments, a data model may be defined and/or stored as a JavaScript Object Notation (JSON) file. In other cases, in at least one of the various embodiments, data models may be implemented using, XML, Python, C++, Perl, Java, C, or the like.

In at least one of the various embodiments, a data model object corresponds to some type/portion of data in stored in a data repository. In at least one of the various embodiments, data model objects may correspond to events. In at least one of the various embodiments, they may correspond to a transaction or an abstract concept such as "user". In at least one of the various embodiments, data model objects may have a set of fields. Some fields of a data model object may be required while other fields may be optional.

In at least one of the various embodiments, fields may include types such as numerical, string, Boolean, and timestamp, as specified in the data model. In at least one of the various embodiments, a data model object's fields may correspond directly to fields extracted from data in the data repository or they may be calculated by the data modeling application using formulas, regular expressions, or other built-in commands.

In at least one of the various embodiments, data model object 502 may be arranged to support and/or require certain attributes and/or properties. In at least one of the various embodiments, attribute ObjectName 504 may include the name of the data model object. In at least one of the various embodiments, if the data model is implemented using an object oriented programming language, ObjectName 504 may be a class type or class name supported by the underlying language.

In at least one of the various embodiments, attribute parentName 506 may include an identifier indicating the identity of a parent data model object data model object 502. In at least one of the various embodiments, parentName 506 may be employed by the data modeling application to determine if a data model object is a child object of another data model object.

In at least one of the various embodiments, if a value is included for parentName 506, the data modeling application may determine that the data model object derives from the parent data model object. In at least one of the various embodiments, a child data model object may inherit characteristics, such as, fields, constraints, filters, or the like, from their corresponding parent data model objects.

In at least one of the various embodiments, if parentName 506 is not explicitly set, the data modeling application may default to the parentName to an appropriate value that may correspond to a built-in root/base class (e.g., Event, or Transaction).

In at least one of the various embodiments, fields 508 may be a collection of name-value pairs that may be employed to represent properties of the data model object. In at least one of the various embodiments, fields may have various properties, features, or meta-data that may be employed by the data modeling application to determine the characteristics of a particular field. (See FIG. 6 and its accompanying description.)

In at least one of the various embodiments, fields may be determined and/or associated with the data model object based on defaulting rules. Such rules may be included in one or more configuration files and/or configuration stores. Also, in at least one of the various embodiments, fields may be determined by users through a user-interface.

In at least one of the various embodiments, data model objects may include additional properties and/or behaviors such as Calculations 510, Constraints 512, or the like. In at least one of the various embodiments, calculations 510 may be employed to generate field values based on the operation of formulas, functions, custom scripts, or the like. In at least one of the various embodiments, constraints may be employed to exclude data from matching a data model object. In at least one of the various embodiments, constraints may include regular expressions that may be employed to determine if data from a data repository matches and/or maps to a data model object. For example, in at least one of the various embodiments, if a data repository includes web server log events, a regular expression style constraint of uri="*css" may constrain a data model object to map to web server log events that correspond to HTTP requests for CSS style sheets (e.g, based on the style sheet having an file extension of ".css").

Also, in at least one of the various embodiments, constraints may include logical and/or arithmetic expressions, such as, "bytes>2000" or "code=404", or the like. Further, in at least one of the various embodiments, the rules or formulas included in calculations and/or constraints may reference one or more fields or calculations or constraints.

As an example, in at least one of the various embodiments, data model object 514 may be configured to represent a HTTP request event. HTTP_REQUEST 516 may be the data model object name. Further, in at least one of the various embodiments, http requests may be derived from an event data model object. Thus, in at least one of the various embodiments, EVENT 518 may be the parent name.

In at least one of the various embodiments, fields 520 may include name value pairs that may be relevant to HTTP requests. Further, in at least one of the various embodiments, HTTP_REQUEST data model objects may be defined with constraint 522 such that eligible values for the status fields are less than 600.

In at least one of the various embodiments, data models may be arranged to represent (e.g., model) unstructured data from various sources. Such sources may include, web server logs, networking system logs, financial transaction events, or the like.

In at least one of the various embodiments, log record 524 may be a HTTP request log record that data model object 514 may be arranged to model. Data included in the log record may be mapped into fields 520 of data model object 514. In at least one of the various embodiments, the particular fields may be identified, collected, and extracted, using a variety of techniques.

Also, data models may be arranged to model data provided in a variety of formats and/or stored in a variety of data repositories including, SQL databases, flat files, fixed record length files, comma separated files (CSV), extensible markup language (XML), or the like.

Figure 6:
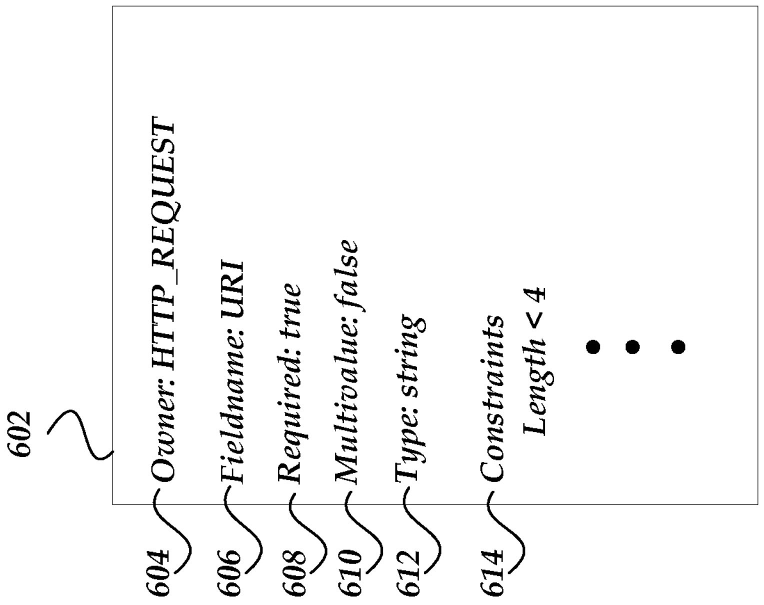
FIG. 6 illustrates for at least one of the various embodiments, the logical data structure of fields that may be part of a data model object.

FIG. 6 illustrates for at least one of the various embodiments, the logical data structure of field 602 that may be part of a data model object, such as, fields 520 in FIG. 5. In at least one of the various embodiments, fields may have a variety of properties that may characterize and/or define the data that the field may be designed to model.

In at least one of the various embodiments, a field may include owner 604, fieldname 606, required flag 608, multi-value flag 610, type 612, constraints 614, or the like. In at least one of the various embodiments, the data modeling application may employ at least a portion of the attributes and/or meta-data associated with a field if determining the mapping between the source data and the data model object.

In at least one of the various embodiments, owner 604 may indicate particular the data model object that may own the field. In at least one of the various embodiments, fieldname 606 may define the name of the field. In at least one of the various embodiments, flags such as required 608 and multi-value 610 may be Boolean style fields that may be true or false. In at least one of the various embodiments, the values of the Boolean attributes may indicate if particular characteristics may be associated with a particular field. For example, in at least one of the various embodiments, required attribute 608 may be interpreted by the data modeling application to indicate that the corresponding field is required to be filled/populated with data. Likewise, in at least one of the various embodiments, field attribute 610 may be interpreted by the data modeling application to indicate if the field may include multiple values.

In at least one of the various embodiments, type attribute 612 may be interpreted by the data modeling application to classify the field data based on the type of data expected. For example, in at least one of the various embodiments, common data types may include, integer, string, numeric, date-time, timestamp, Boolean, or the like.

Also, in at least one of the various embodiments, fields may be associated with constraints that may be applied by the data modeling application as part of determining eligible values for the field. For example, in at least one of the various embodiments, constraints 614 may be employed by the data modeling application to determine that eligible/valid data for field 602 requires a length that is greater than four.

Figure 7:
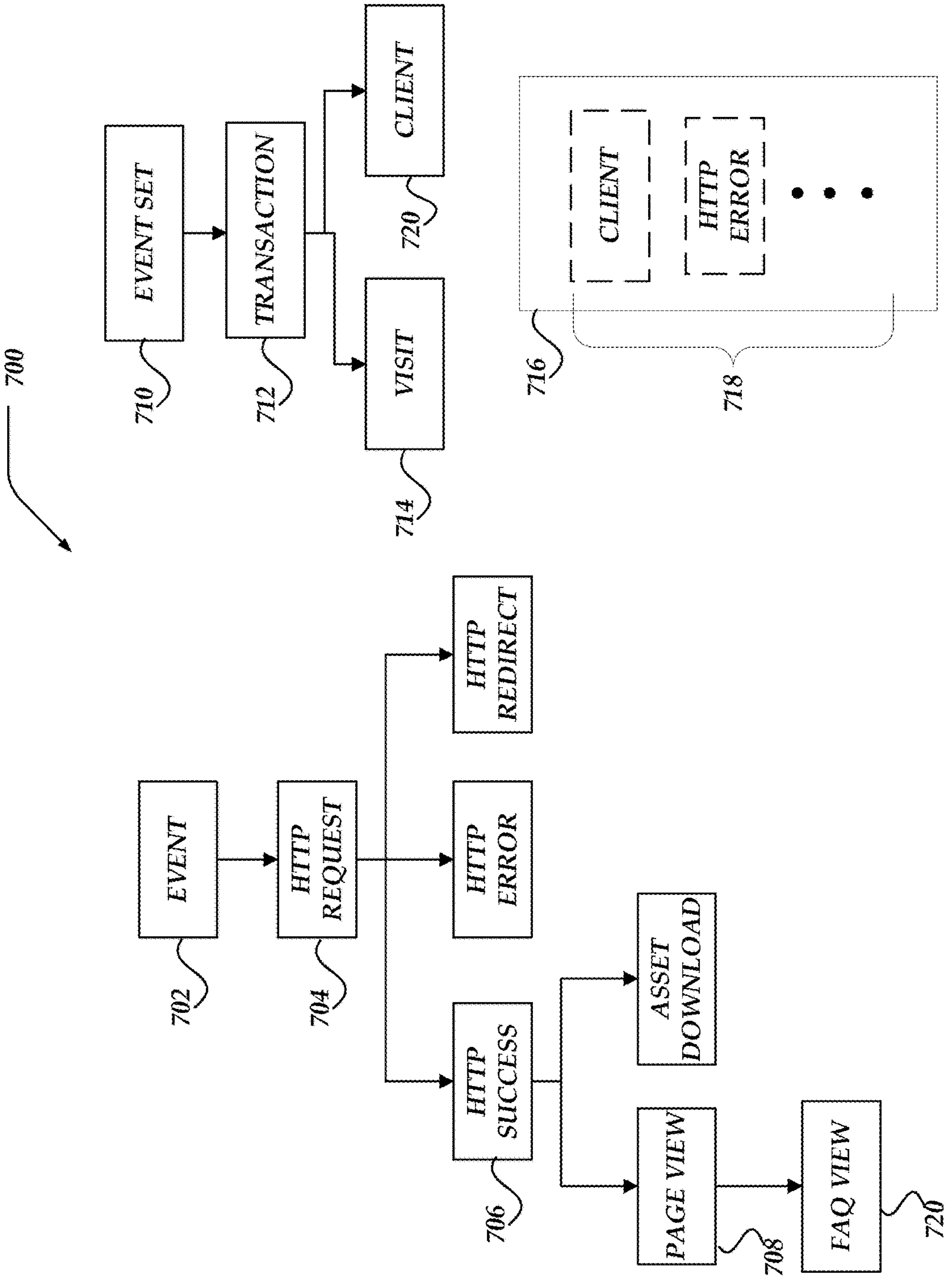
FIG. 7 illustrates for at least one of the various embodiments, a logical representation of a data model that may be generated and/or employed by the data modeling application.

FIG. 7 illustrates for at least one of the various embodiments, a logical representation of a data model that may be generated and/or employed by the data modeling application. In at least one of the various embodiments, the data modeling application may employ general object oriented concepts based on, and/or similar to object-oriented programming languages and/or platforms, such as, C++, Java, Objective-C, C#, or the like.

Further, data model 700 in FIG. 7 may be a non-limiting example embodiment of a data model that may be generated using at least one of the various embodiments. One of ordinary skill in the art will appreciate that a variety of data models may be generated using at least one the various embodiments for a variety of different application contexts. The particular model discussed in FIG. 7 is presented in the interest of brevity and to provide additional clarity in the description of at least one of the various embodiments. Accordingly, it should be obvious to one of ordinary skill in the art that the subject matter disclosed and/or claimed herein enable the generation of data models other than the one depicted in FIG. 7.

In at least one of the various embodiments, the data model in FIG. 7 may represent a portion of a data model directed towards modeling events that may be related to HTTP servers and client interaction with HTTP servers.

In at least one of the various embodiments, model object EVENT 702 may be the root of the data model. In at least one of the various embodiments, it may be a base data model object that provides core properties and behaviors that may be expected to be common to many events the data model may be expected model.

In at least one of the various embodiments, data model object HTTP REQUEST 704 may be derived from EVENT 702. In at least one of the various embodiments, data model object 704 may be specialization of EVENT 702 that may include properties and fields that may be expected to be associated with a HTTP request events. In at least one of the various embodiments, such properties may include a uniform resource identifier (URI) field, a referrer field, or the like. (See, FIG. 5.)

Further, in at least one of the various embodiments, data model object HTTP SUCCESS 706 may be derived from HTTP REQUEST 704. In at least one of the various embodiments, HTTP SUCCESS 706 may be a data model object specialized to represent a HTTP request that had a successful outcome. In at least one of the various embodiments, such specialization may include a constraint that requires the status of the request to be 200, 201, 202, 203, 204, or the like (e.g., success status codes that start with 2).

In at least one of the various embodiments, PAGE VIEW 708 may be a further specialization derived from HTTP SUCCESS 706 that models successful HTTP requests that may represent a client viewing a web page. Also, in at least one of the various embodiments, FAQ VIEW 720 may be a further specialization of PAGE VIEW 708. In one embodiment FAQ VIEW 720 may include one or more constraints that limit the data model object to representing successful HTTP views of a frequently asked question page (FAQ).

In at least one of the various embodiments, data model objects in a data model may have different and/or separate root model objects. In at least one of the various embodiments, EVENT SET 710 may be a root data model object that may be arranged to model one or more events group based on criteria defined by the event set object. In at least one of the various embodiments, event set objects may be employed to detect and/or perform operations on groups of events. For example, event set objects may be employed to run a clustering algorithm on the data in the data repository for determining groups of similar events.

In at least one of the various embodiments, TRANSACTION OBJECT 712 may be a specialization of an event set object that may be defined to model events that occur within a determined time period, in a particular order, having particular field values, or the like.

In at least one of the various embodiments, data model object VISIT 714 may be a specialized transaction that may be arranged to model one or more particular sequence of events that represent a user visiting a portion of a website. Likewise, data model object CLIENT 720 may be defined to represent a sequence of events that represent a client visiting a website.

In at least one of the various embodiments, users may employ the data modeling application to generate searches and/or reports based on a data model. In at least one of the various embodiments, search object 716 may be defined by selecting one or more data model objects 718. In at least one of the various embodiments, a search object may be defined to apply particular fields of one or more data model objects to implement a search that corresponds to the a desired report. Also, in at least one of the various embodiments, a search object may be defined to include its own fields that may be employed to produce, format, and/or display portions of the data model objects that may be included the report.

In at least one of the various embodiments, search objects may include one or more fields from one or more data model objects. Also, in at least one of the various embodiments, search objects may include aggregate fields that enable the computation and display of aggregate results such as, sums, maximum, root-mean square, or the like, to be determined as part of a report.

Figure 8:
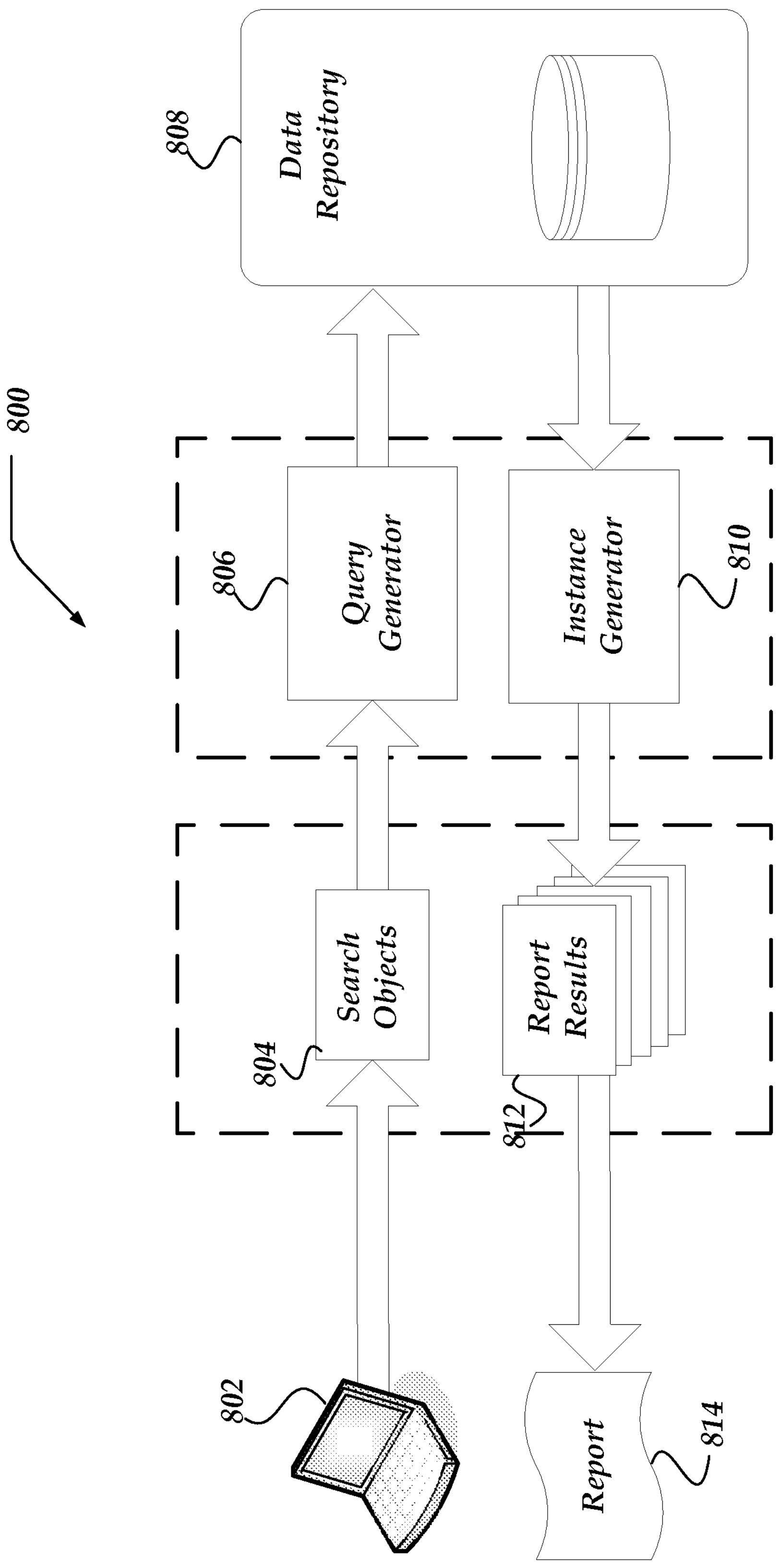
FIG. 8 illustrates a logical overview of a system for at least one of the various embodiments for generating reports using a data model.

FIG. 8 illustrates a logical overview of data modeling application 800 for at least one of the various embodiments for generating reports using a data model. In at least one of the various embodiments, a user may initiate the generation of a report at a user-interface on network device 802.

In at least one of the various embodiments, the user may select and/or generate search objects 804. In at least one of the various embodiments, search objects 804 may comprise search elements selected from one or more data models. In at least one of the various embodiments, search objects may be retrieved from a set of previously generated search objects or it may be generated at the time the user generates the report.

In at least one of the various embodiments, search objects may be generated based on data model objects selected from a data model. In at least one of the various embodiments, the data model object constraints, fields, or constraints used to define a data model object may be sufficient for searching to generating the expected report results. In at least one of the various embodiments, search objects may be processed by the data modeling application to generate query strings that may be executed against one or more data repositories.

For example, in at least one of the various embodiments, data model object FAQ VIEW 720 may include a constraint that requires a uniform resource identifier (URI) field to match a particular page (e.g., www.splunk.com/faq.html) to produce report results that include events representing page views of a FAQ page (e.g., matching the URI pattern of interest).

In at least one of the various embodiments, the selected/generated search objects may be received by query generator 806. In at least one of the various embodiments, query generator 806 may employ the search objects, and/or the data model to generate a query string and/or search string that may correspond to the requested report. In at least one of the various embodiments, the query string and/or search string may be generated based on the data model objects that may contribute data to the report.

In at least one of the various embodiments, data repository 808 may receive the query string generated by query generator 806. In at least one of the various embodiments, the query string may be executed against data stored in the data repository to produce a corresponding result set. In at least one of the various embodiments, the result set may be presented in a format native to the operative data repository.

In at least one of the various embodiments, instance generator 810 may receive the result set from the data repository and produce instances of data model objects corresponding to the result set. In at least one of the various embodiments, instance generator 810 may generate report results 812 that may include a collection of instantiated data model objects.

From report results 812, in at least one of the various embodiments, a report may be generated. In at least one of the various embodiments, report 814 may be formatted for a user to read on web page or other user interface. Also, in at least one of the various embodiments, reports may be formatted for printing, exporting to other applications, exporting to other network devices, archiving, or the like.

In at least one of the various embodiments, reports, report views, and/or report formatting may be based on the data model, search objects, or report templates associated with the generated report results. For example, in at least one of the various embodiments, data model objects comprising the report results may include several fields, such as, URI, Timestamp, Referrer, CookieName, or the like. A report view, in at least one of the various embodiments, may be configured to selectively list a portion of the available fields, such as, just the URI and Timestamp. In at least one of the various embodiments, a user may design reports and/or report templates in terms of the data models and/or search objects (e.g., for pivot reports). In at least one of the various embodiments, the one or more report models may be employed to generate the reports.

Generalized Operation

Figure 9:
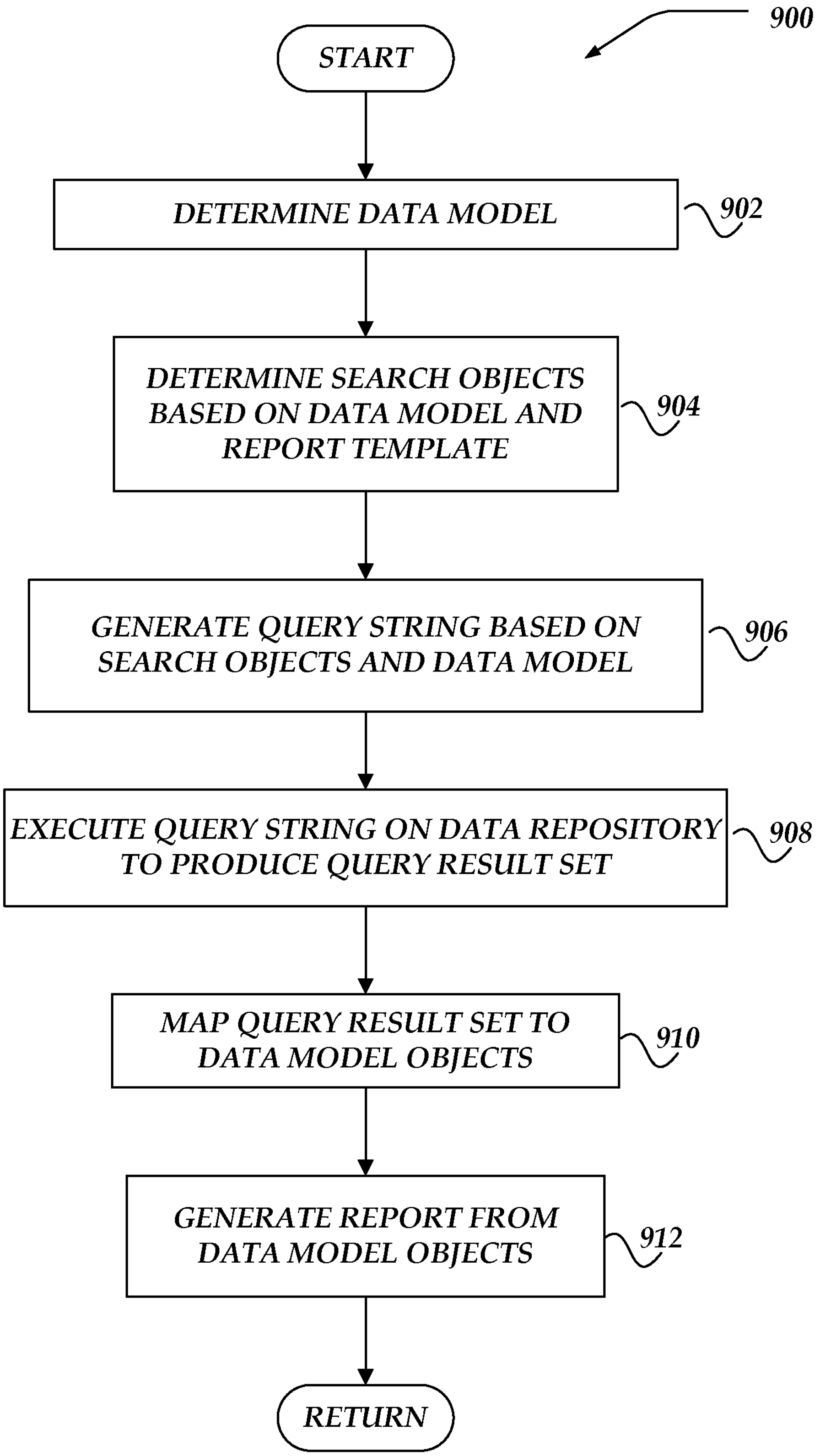
FIG. 9 shows an overview flow chart for at least one of the various embodiments for process for data modeling for machine data for semantic searching.

FIGS. 9-16 represent the generalized operation of at least one of the various embodiments. FIG. 9 shows an overview flow chart for at least one of the various embodiments for process 900 for data modeling for machine data for semantic searching. After a start block, at block 902, in at least one of the various embodiments, determine a data model that may be used to model data stored in a data repository.

In at least one of the various embodiments, data models may be selected from a set of one or more previously generated data models or a new data model may be generated. In at least one of the various embodiments, different users may determine and/or generate separate data models where each data model may represent a different view and/or perspective of the data stored in the data repository.

In at least one of the various embodiments, data models may be generated to represent (e.g., model) unstructured data that may be stored in a data repository. In at least one of the various embodiments, unstructured data may include data generated and/or received by search engines, including a time series engine. Also, in at least one of the various embodiments, unstructured data may be received and/or stored absent pre-defined data schemas or formats.

In at least one of the various embodiments, the data model may be determined such that it at least provides semantic meaning to unstructured data stored in data repository. In at least one of the various embodiments, data models may be generated to provide at least semantic meaning to unstructured data without the creating a static database schema. Further, in at least one of the various embodiments, one or more data models may be generated such that the unstructured data may remain unmodified. Thus, data models, in at least one of the various embodiments, may provide semantic meaning to unstructured data without modifying the unstructured data (e.g., causing little or no side-effect).

In at least one of the various embodiments, data models also may be generated to provide at least semantic meaning to structured data that may be stored in SQL databases, XML files, or the like.

At block 904, in at least one of the various embodiments, determine one or more search objects based on the determined data model and/or a selected report template. In at least one of the various embodiments, search objects may be data model objects selected from the data model. Also, in at least one of the various embodiments, search objects may be generated based on one or more report templates that may include portions of one or more data model objects from one or more the data models. In at least one of the various embodiments, search objects may include calculations and filters that may be applied to generate results, views, reports, or the like.

At block 906, in at least one of the various embodiments, the data modeling application may generate a query string based on one or more determined search object(s) and/or one or more determined data models. In at least one of the various embodiments, the query string may be formatted to be compatible with at least one targeted data repository.

In at least one of the various embodiments, the data modeling application may traverse at least a portion of the data model to generate at least a portion of a query string for searching data in at least one data repository, wherein the portion of the data model is determined based on the at least one search object.

At block 908, in at least one of the various embodiments, the generated query string may be executed at or on a data repository to produce a result set that may correspond to the query string.

At block 910, in at least one of the various embodiments, the data modeling application may receive the query result set from the data repository. In at least one of the various embodiments, the data modeling application may map the values and/or records included in a result set to the appropriate data model objects. In at least one of the various embodiments, one or more instances of data model objects may be instantiated that correspond to data included in the result set.

In at least one of the various embodiments, the mapping process may determine the data model objects that correspond to the result set data, based on the filters, constraints, or fields that may be determined to match the data in the result set.

In at least one of the various embodiments, the data modeling application may map data from at least one portion of the result set to at least one data model object included in the data model, wherein the at least one portion of the result set is based on a configuration of the data model. For example, in at least one of the various embodiments, data models and/or data model objects may be configured to include filters, constraints, fields, or the like, which may be employed to identify and/or extract one or more portions of the result set for mapping to the data model and/or data model objects.

At block 912, in at least one of the various embodiments, generate a report based on the mapped data model objects and/or result set. In at least one of the various embodiments, reports may be formatted using well-known techniques based on at least the expected target audience. In at least one of the various embodiments, reports may be formatted for viewing and/or manipulation by users (e.g., presented in web pages). In at least one of the various embodiments, the data modeling application may generate at least one report for the at least one data model object that corresponds to the data mapped from the at least one portion of the result set. Also, in at least one of the various embodiments, reports may be formatted for importing into other applications, other machines, network devices, or the like.

Figure 10:
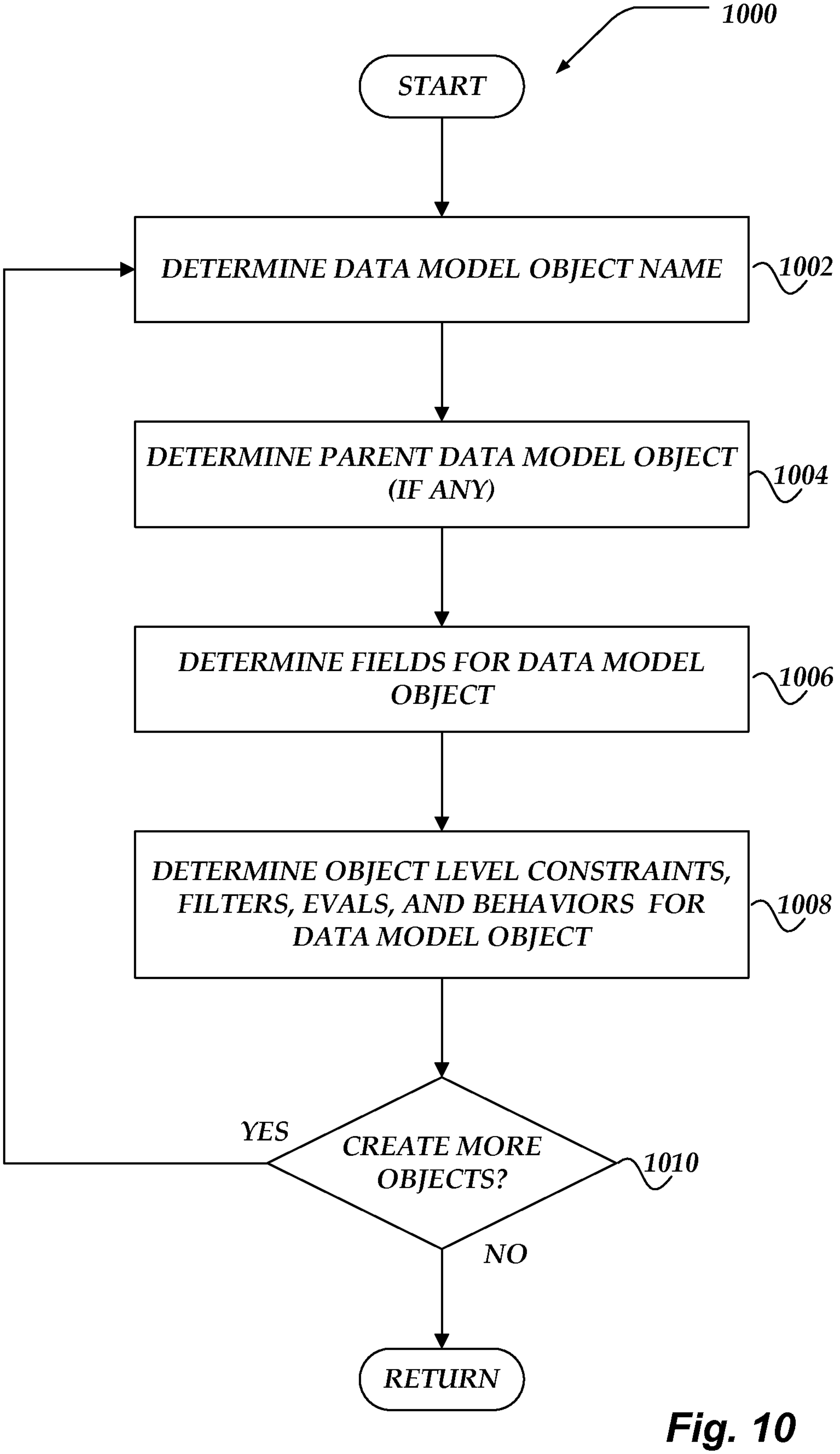
FIG. 10 shows an overview of a process for generating a data model object in accordance with at least one of the various embodiments.

FIG. 10 shows an overview of process 1000 for generating a data model object in accordance with at least one of the various embodiments. After a start block, at block 1002, in at least one of the various embodiments, determine data model object name. In at least one of the various embodiments, data model objects that may be included in a data model may be named such that they may be uniquely identified. Also, in at least one of the various embodiments, data model objects may be assigned user permission/access attributes that may influence how a given user may interact with the data model object. For example, in at least one of the various embodiments, some users may have permission to modify the internal properties of a data mode object, while other users may be restricted to read-only access to the data model object's properties.

At block 1004, in at least one of the various embodiments, the data modeling application may determine a parent data model object for the generated data model object. In at least one of the various embodiments, each data model object may have a corresponding parent data model object. In at least one of the various embodiments, determining a parent data model object may depend on the purpose, owner, or the like, of the data model object.

In at least one of the various embodiments, additional data model objects in the data model may be derived from the parent data model object. In at least one of the various embodiments, well-known object-oriented programming characteristics, such as, inheritance, polymorphism, or the like, may be supported by data model objects.

In at least one of the various embodiments, the parent data model objects may provide fields, constraints, filters, or the like, to child data model objects that may be in the data model. In at least one of the various embodiments, the parent data model object may also provide interfaces that may influence how child data model objects may be defined.

Also, in at least one of the various embodiments, new data model objects may be generated separate from a parent data model objects. In at least one of the various embodiments, such data model objects may automatically receive a parent data model object provided by the data modeling application.

At block 1006, in at least one of the various embodiments, fields for the data model object may be determined. In at least one of the various embodiments, zero or more fields may be generated and associated with the data model object.

In at least one of the various embodiments, a portion of the fields that comprise the parent data model object may be considered to be part of the generated data model object based on object oriented inheritance. In at least one of the various embodiments, fields derived from a parent data model object may be fixed, un-editable, and/or non-removable.

At block 1008, in at least one of the various embodiments, additional data model object attributes and properties may be determined. In at least one of the various embodiments, these may include filters, functions (e.g., evaluations, calculations, aggregations, or the like), constraints, or the like.

At decision block 1010, in at least one of the various embodiments, if more data model objects remain to be generated, control may loop to block 1002. Otherwise, in at least one of the various embodiments, control may be returned to a calling process.

In at least one of the various embodiments, data model objects may be added to data models subsequent to the initial generation of the data model. Likewise, data model objects may be removed from a data model subsequent to the initial generation of the data model.

In at least one of the various embodiments, if a parent data model object is removed from a data model, its child data model objects may be updated and associated with other data model objects, or they may be removed from the data model as well. In at least one of the various embodiments, the portions of the data model objects that depend on the removed parent data model object may be modified such the data model remains consistent. For example, if a parent data model object is removed that corresponding child data model object may be removed as well. Thus, in at least one of the various embodiments, a user may be asked for input as to how to proceed. In some cases, the child data model objects may remain part of the data model after having their data model parent objects adjusted appropriately. In at least one of the various embodiments, a user may be notified that removing the parent data model object may affect other data model objects. In such cases, in at least one of the various embodiments, a user interface may be provided that enables the user to direct the data modeling application to take the appropriate action.

Figure 11:
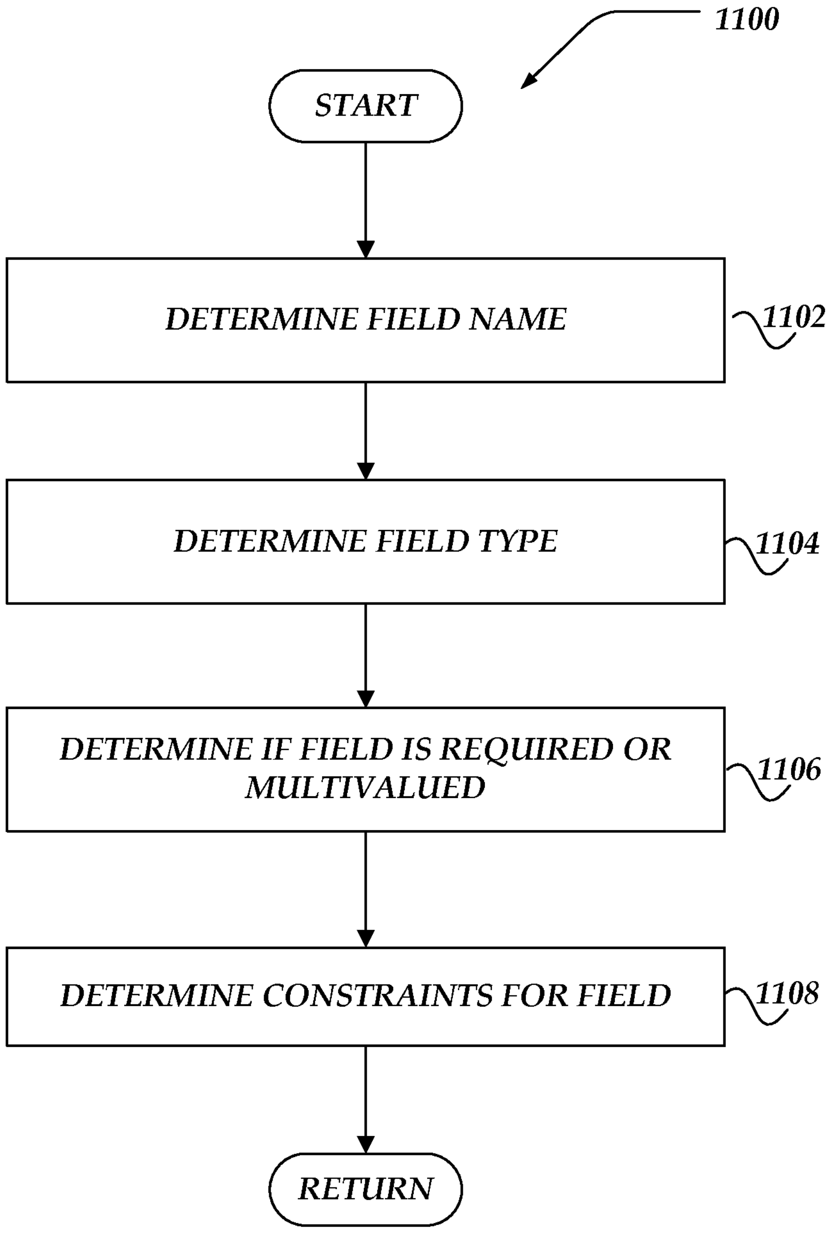
FIG. 11 shows an overview flowchart of a process for generating fields that may comprise a data model object in accordance with at least one of the various embodiments.

FIG. 11 shows an overview flowchart of process 1100 for generating fields that may comprise a data model object in accordance with at least one of the various embodiments. After at start block, at block 1102, in at least one of the various embodiments, a field name may be determined for the new field.

At block 1104, in at least one of the various embodiments, a field type may be determined for the new field.

At block 1106, in at least one of the various embodiments, Boolean attributes may be determined for the new field. Also, in at least one of the various embodiments, "flag" type attributes may be determined for the new field. Boolean and/or flag attributes may be used to define properties, such as, read-only, required, multi-valued, or the like.

At block 1108, in at least one of the various embodiments, additional constraints and/or fields may be determined and associated with the new field.

Figure 12:
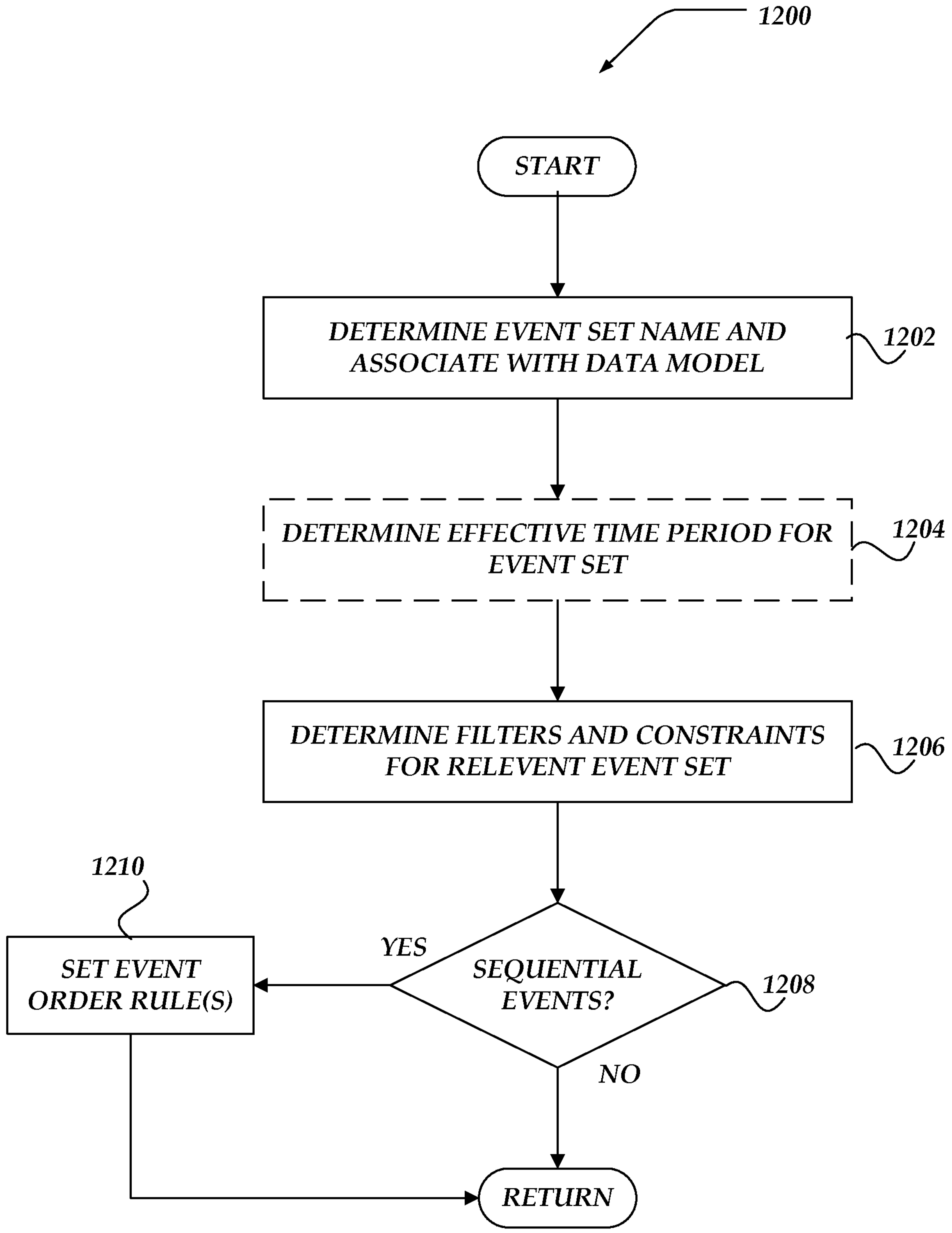
FIG. 12 shows an overview flowchart for a process for generating transactions that may be associated with a data model object and/or data model in accordance with at least one of the various embodiments.

FIG. 12 shows an overview flowchart for process 1200 for generating an event set data model object that may be associated with a data model. After a start block, at block 1202, in at least one of the various embodiments, a name may be determined for the event set object and associated with the event set object. Also, in at least one of the various embodiments, the generated event set data model object may be associated with a data model using well-known programming techniques, such as, references, lookup-tables, pointers, or the like.

At block 1204, in at least one of the various embodiments, optionally the effective time period for the event set object may be determined. In at least one of the various embodiments, time periods may be included in event set objects to collect and/or group events that occur within the determined time periods.

At block 1206, in at least one of the various embodiments, filters, constraints, rules, or the like may be determined to define the events and/or data that may correspond to the event set object.

At decision block 1208, in at least one of the various embodiments, if the event set object is intended to match an event sequence, control may move to block 1210. Otherwise, in at least one of the various embodiments, control may be returned to a calling process.

In at least one of the various embodiments, an event set object may be arranged to model a transaction that identifies a set of events that occur in a set period of time. Thus, in at least one of the various embodiments, the one or more events that contribute to the transaction may be defined and associated with the event set object. For example, in at least one of the various embodiments, if the event set object is intended to model a user visiting a web site, the event set object may be generated to match page view events generated by the same user that may occur within 10 minutes of each other.

At block 1210, in at least one of the various embodiments, the event sequencing/ordering matching rules may be established the event set object. In at least one of the various embodiments, an event set object may be arranged to represent a set events that arrive in a particular order within a particular time period by defining constraints that correspond to the order the events are received. For example, in at least one of the various embodiments, a constraint such as, "purchaseConstraint=login.html, store.html, *, checkout.html, confirm.html" may define a event set object that models the behavior a user logging into to system before completing a purchase.

Next, control may be returned to a calling process.

Figure 13:
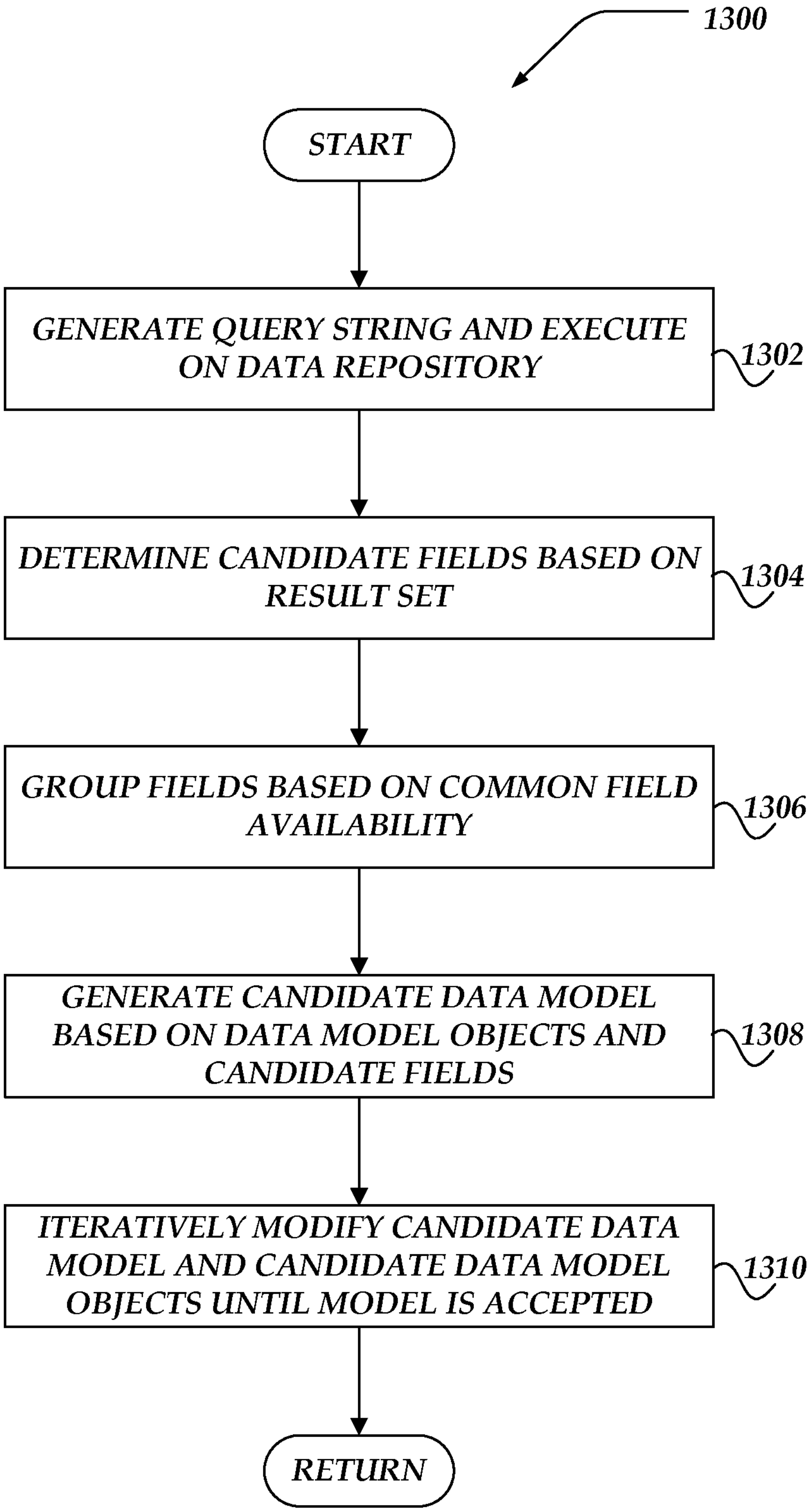
FIG. 13 illustrates a flowchart showing an overview of a process for generating a data model from query results in accordance with at least one of the various embodiments.

FIG. 13 illustrates a flowchart showing an overview of process 1300 for generating a data model from query results. After a start block, at block 1302, in at least one of the various embodiments, generate a query string and execute it on a data repository. In at least one of the various embodiments, executing the query string may produce a result set that corresponds to the query string.

At block 1304, in at least one of the various embodiments, determine candidate data model object fields based on the result set that corresponds to the query string. In at least one of the various embodiments, result sets may include records that have similar elements. In at least one of the various embodiments, the elements may be explicitly available in the result set, such as for SQL database results that return results organized into named columns. In at least one of the various embodiments, result sets may be generated from unstructured data where candidate field names and values may be identified and extracted from the unstructured data record.

In at least one of the various embodiments, the candidate fields may be displayed in a user-interface list enabling a user to interactively select them. Or, in at least one of the various embodiments, the candidate fields may be provided to the user in list.

At block 1306, in at least one of the various embodiments, the result set records may be analyzed to determine the fields the records may have in common. In at least one of the various embodiments, records having fields in common may be useful for determining potential parent-child data model objects.

For example, in at least one of the various embodiments, result records related to HTTP events may each include a source IP address and a HTTP method (GET, HEAD, PUT, POST, or DELETE). Thus, in at least one of the various embodiments, a data modeling application may determine that each result record that includes a source IP address and HTTP method may be a candidate for a HTTP Request data model object. Further, in this example, if some records include a source IP address, a HTTP method and a 200 series HTTP response code (indicating success), those records with may be determined to be specializations of the HTTP Request, in this case, a HTTP Success event.

At block 1308, in at least one of the various embodiments, at least one candidate data model may be generated based on the candidate data model objects and the candidate fields and the relationships/commonalities of the fields in the result set records. The candidate data model and/or candidate data model objects may be presented in a user-interface enabling the user to select and/or modify them.

At block 1310, in at least one of the various embodiments, the candidate data model and/or the candidate data model objects may be iteratively modified until they may be accepted as sufficiently modeling the source data.

Figure 14:
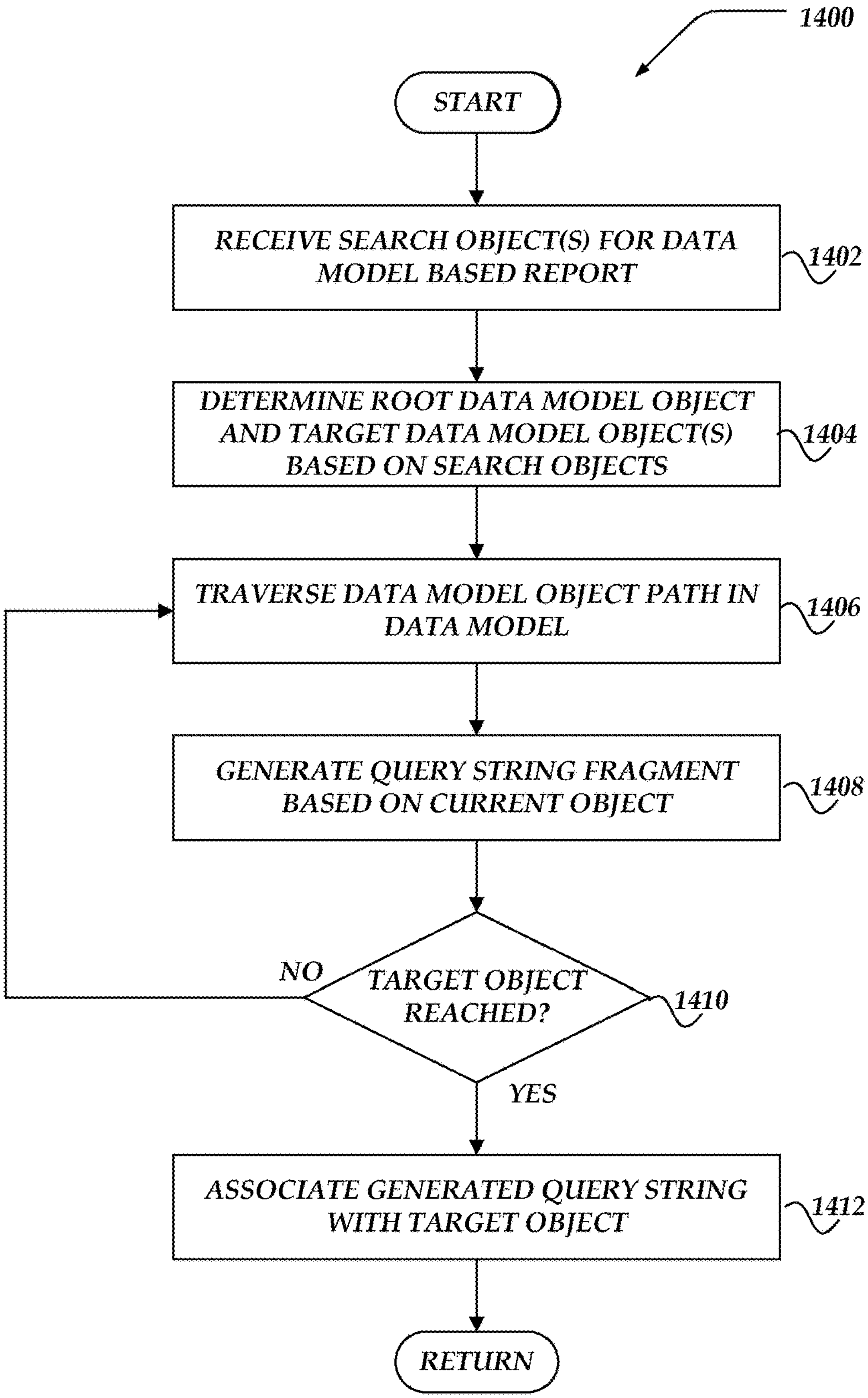
FIG. 14 illustrates a flowchart showing an overview of a process for generating query strings that correspond to a data model.

FIG. 14 illustrates an overview flowchart of process 1400 that may generate query strings that correspond to a data model. After a start block, at block 1402, in at least one of the various embodiments, search object(s) for a data model based report may be received. In at least one of the various embodiments, search objects may be one or more data model objects. Also, in at least one of the various embodiments, search objects may be specialized search objects that may reference one or more data model objects, including pivot table objects.

At block 1404, in at least one of the various embodiments, the root data model object and at least one target data model object may be determined based on the received search objects. In at least one of the various embodiments, the data modeling application may analyze the search objects to determine the root and/or top data model objects that may be relevant for the report. Also, in at least one of the various embodiments, the search object may be processed by the data modeling application to determine a target data model object. For example, in at least one of the various embodiments, if a search object represents a single data model object, such as, PAGE VIEW 708, then PAGE VIEW 708 would be the target data model object.

In at least one of the various embodiments, the data modeling application may traverse the data model in reverse (upwards) from the target data model object to identify the root data model object for the report. For example, in at least one of the various embodiments, referring to data model 700, if the target data model object is HTTP SUCCESS 706, the root data model object would be EVENT 702.

At block 1406, in at least one of the various embodiments, the data modeling application may traverse the data model object path between the determined root data model object and a determined target data mode object. In at least one of the various embodiments, the data modeling application may traverse the data model starting at the root data model object. In at least one of the various embodiments, during the traverse, the data modeling application may visit each data model object on the path between the root object and the target data model object.

In at least one of the various embodiments, the data modeling application may employ well-known methods to traverse data model. One ordinary skill in the art will appreciate that the data model may be logically represented as a hierarchical tree data structure and that a data model may be implemented using a variety of well-known programming methods that may include indexes, lookup tables, linked-lists, arrays, hash tables, map tables, graphs, trees, or the like. Likewise, various well-known traversal strategies may be employed to determine the data model objects to visit and the order for visiting them.

At block 1408, in at least one of the various embodiments, a query string fragment may be generated based on the current data model object. In at least one of the various embodiments, the data modeling application may visit each data model object in the path between the root data model object and the target data model object.

In at least one of the various embodiments, each visited data model object may be analyzed by the data modeling application. In at least one of the various embodiments, query string fragments that correspond to each visited data model object may be generated based on the fields, attributes, properties, or constraints that comprise the visited data model objects.

At decision block 1410, in at least one of the various embodiments, if the target data model object may have been reached by the data modeling application during the traversal of the data model, control may move to block 1412. Otherwise, in at least one of the various embodiments, control may loop back block 1406 to continue traversing the path between the root data model object and the target data model object.

At block 1412, in at least one of the various embodiments, the generated query string may be associated with the search object, report model, and/or the target data model object. Next, control may be returned to a calling process.

In at least one of the various embodiments, a data modeling application may generate query strings that use a language and syntax that may correspond to one or more query languages and/or query protocols supported by the target data repository. For example, in at least one of the various embodiments, if a target data repository is a relational database management system that supports SQL, the data modeling application may generate a query string in the form of SQL query (e.g., SELECT fname1, fname2 FROM table1 WHERE constraint 1=xxx).

Also, in at least one of the various embodiments, if the data repository is search engine, the data modeling application may generate a query string that is in the form of a search engine query suitable for the target search engine, such as, "/search?constraint1=xx&constraint2=yy."

In at least one of the various embodiments, data repositories that have rich query languages may generate result sets that closely model the data model. On the other hand, in at least one of the various embodiments, data repositories that may have primitive query languages may produce result sets that may require additional processing by the data modeling application to enable a mapping of the result set to a data model.

Figure 15:
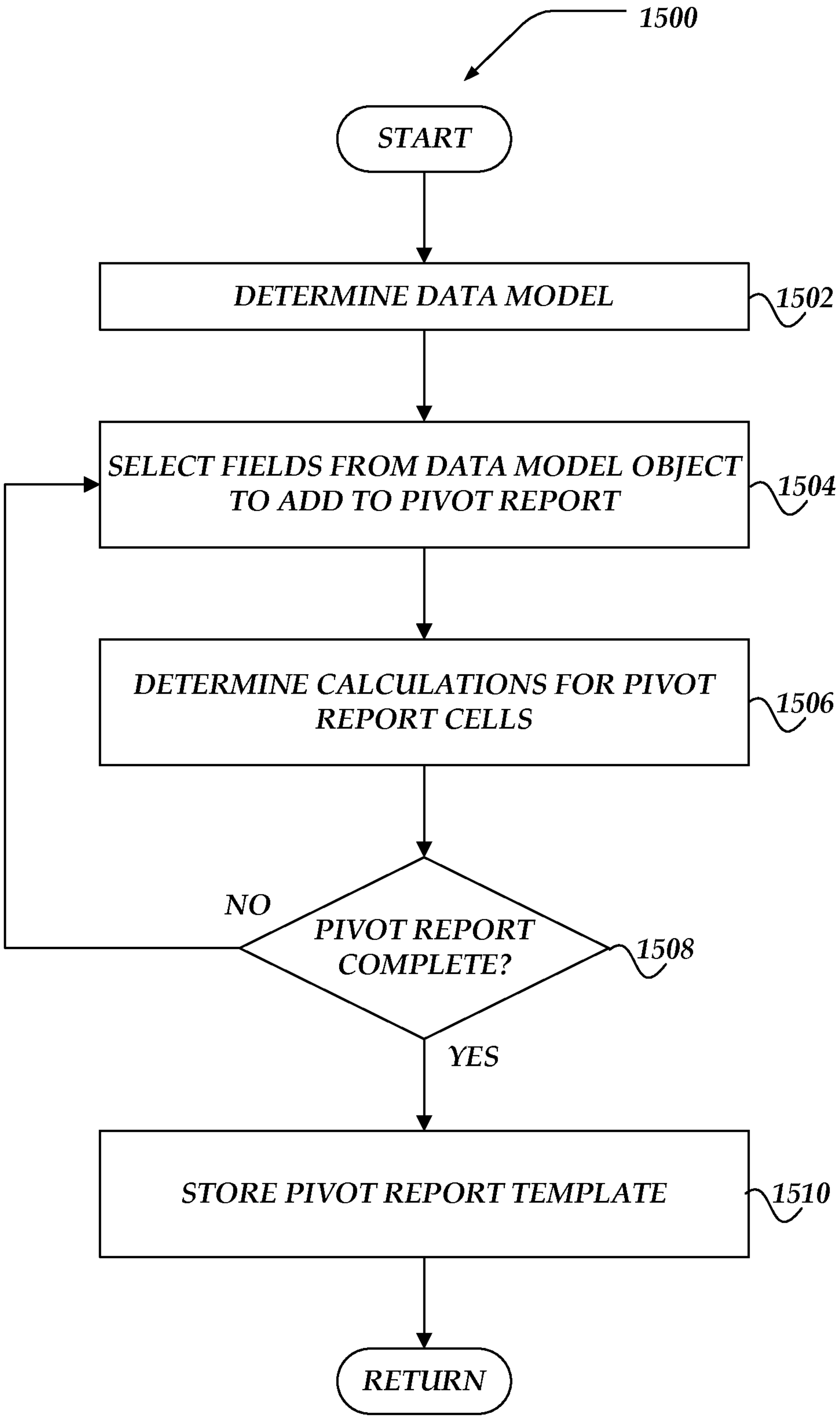
FIG. 15 shows a flow chart for a process for generating a pivot report model in accordance with at least one of the various embodiments.

FIG. 15 shows a flow chart for process 1500 for generating a pivot report model in accordance with at least one of the various embodiments. After a start block, at block 1502, in at least one of the various embodiments, determine a data model that may be used to build the pivot report template.

At block 1504, in at least one of the various embodiments, select fields from data model object(s) to add to the pivot report template. In at least one of the various embodiments, fields may be selected as row fields or column fields for the pivot report.

In at least one of the various embodiments, selecting a field to be row field may cause the data modeling application to generate one row for each unique value of the field that may be in the result set. For example, in at least one of the various embodiments, if a URI field from a HTTP SUCCESS object is selected to be a row field, one row for each unique URI found in the result set may be expected to be in the pivot report.

In at least one of the various embodiments, column fields may be selected to define the columns of the pivot report. In at least one of the various embodiments, these may be the fields selected to be analyzed/reported on for each row in the pivot report. In at least one of the various embodiments, the actual value that is displayed in the row-column cell of the report may depend on additional calculation information that may be associated with the cell.

In at least one of the various embodiments, determine at least one field from at least one data model object for display that is subsequently associated with at least one row in at least one pivot report model. In at least one of the various embodiments, determine at least one field from at least one data model object for display that is subsequently associated with at least one column in the at least one pivot repot model, wherein the at least one column corresponds to the at least one field.

At block 1506, in at least one of the various embodiments, determine calculation for pivot report cells. In at least one of the various embodiments, pivot reports may include one or more cells that display the results of aggregate calculations, such as, sum, average, count, standard deviation, root-mean-square, or the like.

In at least one of the various embodiments, calculations may be selected by users from a pre-filled list. In at least one of the various embodiments, the calculation may default to a particular formula or function based on a configuration value. In at least one of the various embodiments, system wide defaults may be assigned. Also, in at least one of the various embodiments, default calculations may be configured and/or associated to particular users, or to particular data models.

For example, in at least one of the various embodiments, if URI is a row field and BYTES is a column field, a cell may be defined to show the sum of the bytes for each unique URI in the result set.

In at least one of the various embodiments, associate at least one operation (e.g., calculation) for each determined field in a row of the at least one pivot report model, wherein an output of the operation for each determined field in the row is displayed in at least one corresponding column of the pivot report model.

At decision block 1508, in at least one of the various embodiments, if the pivot report is complete, control may move to block 1510. Otherwise, in at least one of the various embodiments, control may loop back to block 1504.

In at least one of the various embodiments, users may generate pivot report templates that have one field from a data model object and one operation (e.g. avg (webhits)). Also, in at least one of the various embodiments, a user may generate one or more pivot report templates based on a single operation that may be applied to an entire data model object, For example, in at least one of the various embodiments, a single count operation that may calculate the number of results that match that data model object may be used to generate a pivot report template.

At block 1510, in at least one of the various embodiments, store the completed pivot report template in stable storage (e.g., hard-drive, file system, database, or the like). In at least one of the various embodiments, the completed pivot report template may be stored for use at some future time or it may be immediately used to generate a pivot report. Also, in at least one of the various embodiments, incomplete pivot report models may be stored in an incomplete state. Incomplete pivot report templates may be retrieved by users to continue generating the pivot report templates. Next, in at least one of the various embodiments, control may be returned to a calling process.

Figure 16:
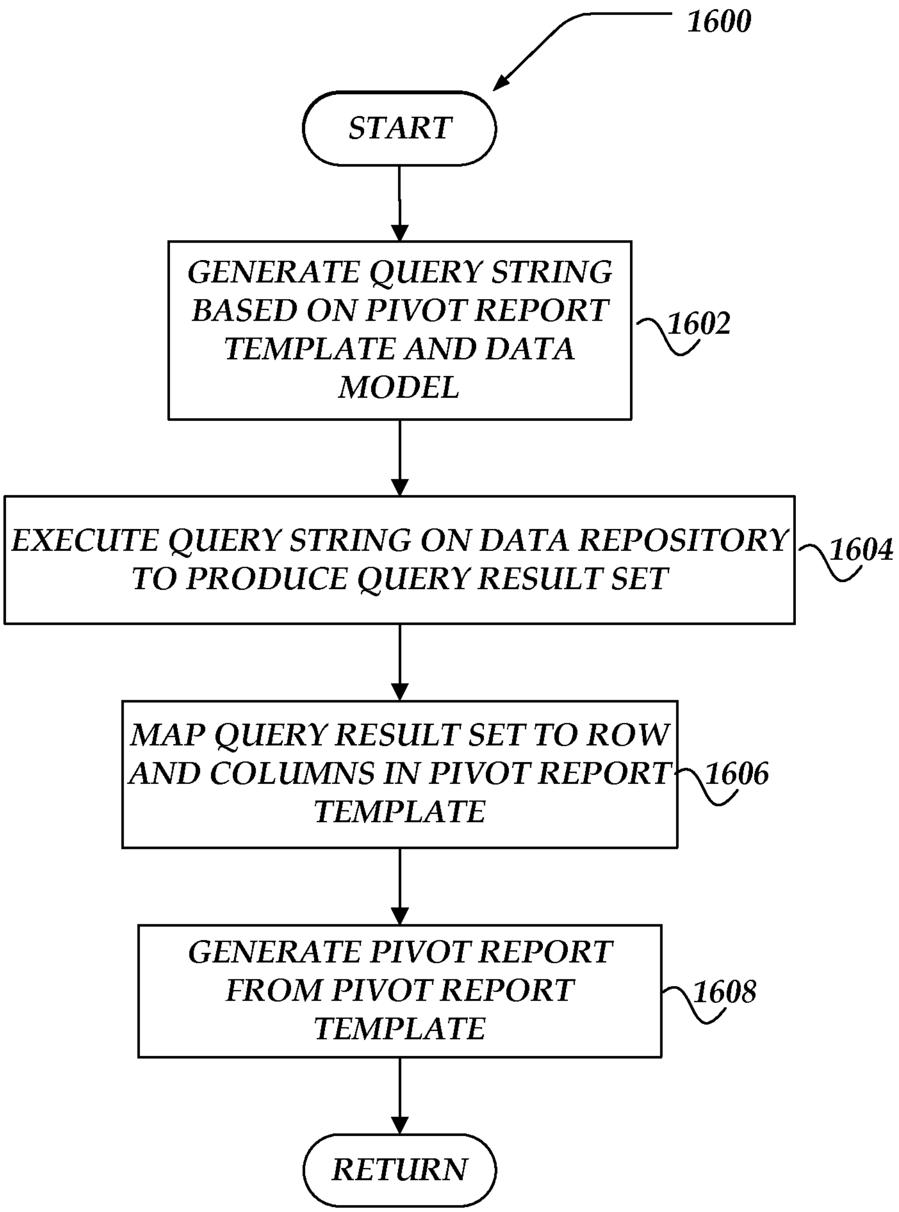
FIG. 16 shows a flow chart for a process for generating a pivot report from a pivot report model and a data model in accordance with at least one of the various embodiments.

FIG. 16 shows a flow chart for process 1600 for generating a pivot report from a pivot report template and a data model in accordance with at least one of the various embodiments. After at start, at block 1602, in at least one of the various embodiments, generate one or more query strings based on a determined pivot report template and a determined data model.

At block 1604, in at least one of the various embodiments, execute the one or more generated query strings on a data repository to produce a query result set that corresponds to the query string.

At block 1606, in at least one of the various embodiments, map the query result set to the row fields and column fields the pivot report template. In at least one of the various embodiments, the row fields may include an entry for each unique value that may be included in the result set. In at least one of the various embodiments, the value for each row-column cell may be determined based on the calculation/function that may be associated with the row-column cell.

In at least one of the various embodiments, the values for the cell may be returned directly as part of the result set. For example, in at least one of the various embodiments, a query string fragment may include a built-in feature of the data repository to generate the cell value, such as "count(*) as rowname-colname" In this example, "count(*)" may be a built in function provided by the data repository that computes of number of the objects returned by query result set. The resulting value may be used directly to fill in the correct cell value for the pivot report. On the other hand, in at least one of the various embodiments, if the data repository does not directly calculate and provide the necessary cell values in the result set, the data modeling application may perform the computations necessary to generate the cell values from the result set for display in the pivot report after receiving the result set from the data repository.

At block 1608, in at least one of the various embodiments, generate a pivot report from the pivot report template. Next, in at least one of the various embodiments, control may be returned to a calling process. In at least one of the various embodiments, the resulting pivot reports may have at least one row and at least one column.

Illustrative User-Interfaces

Figure 17:
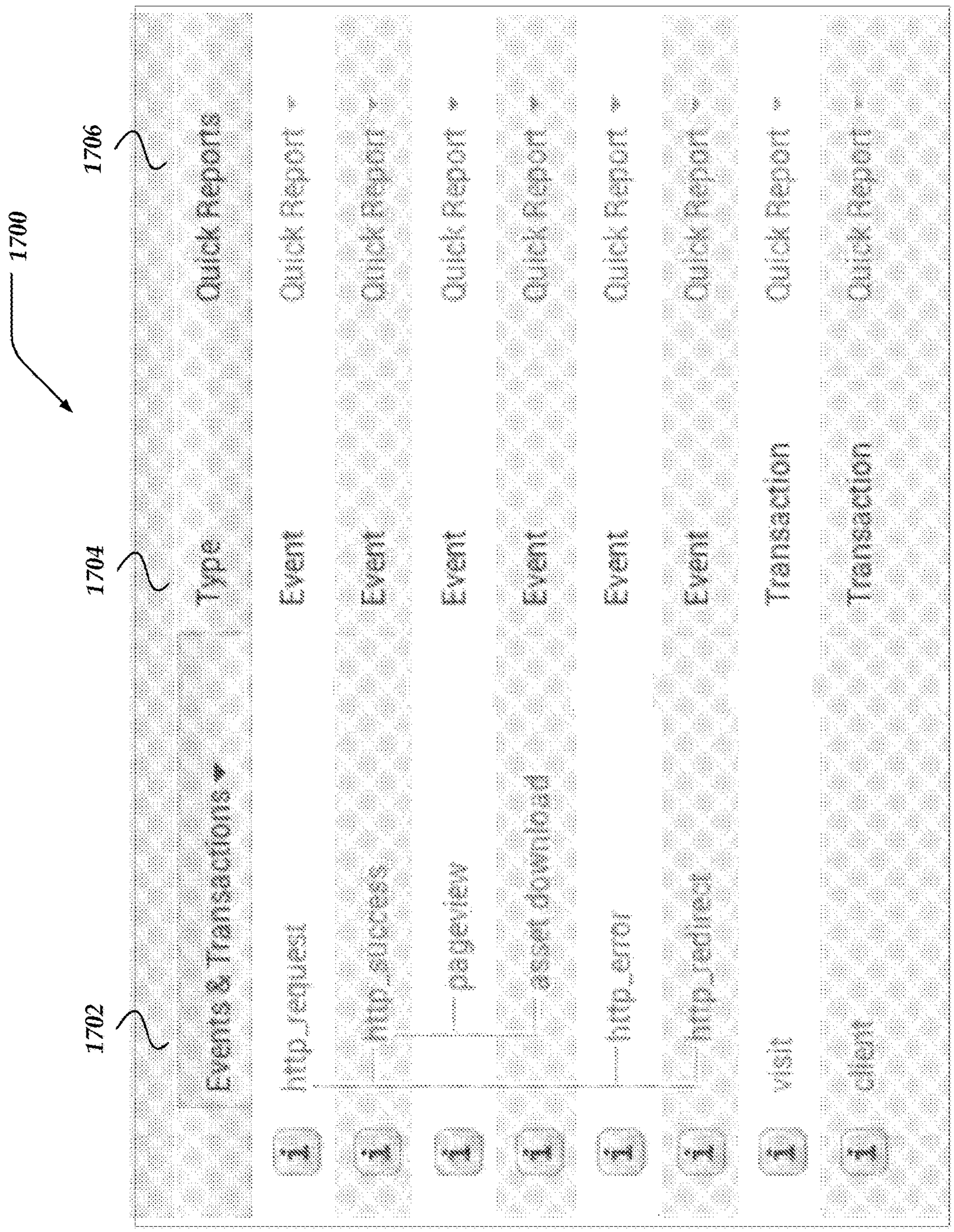
FIG. 17 illustrates a screenshot of a user-interface that shows for at least one of the various embodiments, a user-interface for at least viewing a data model.
Figure 18:
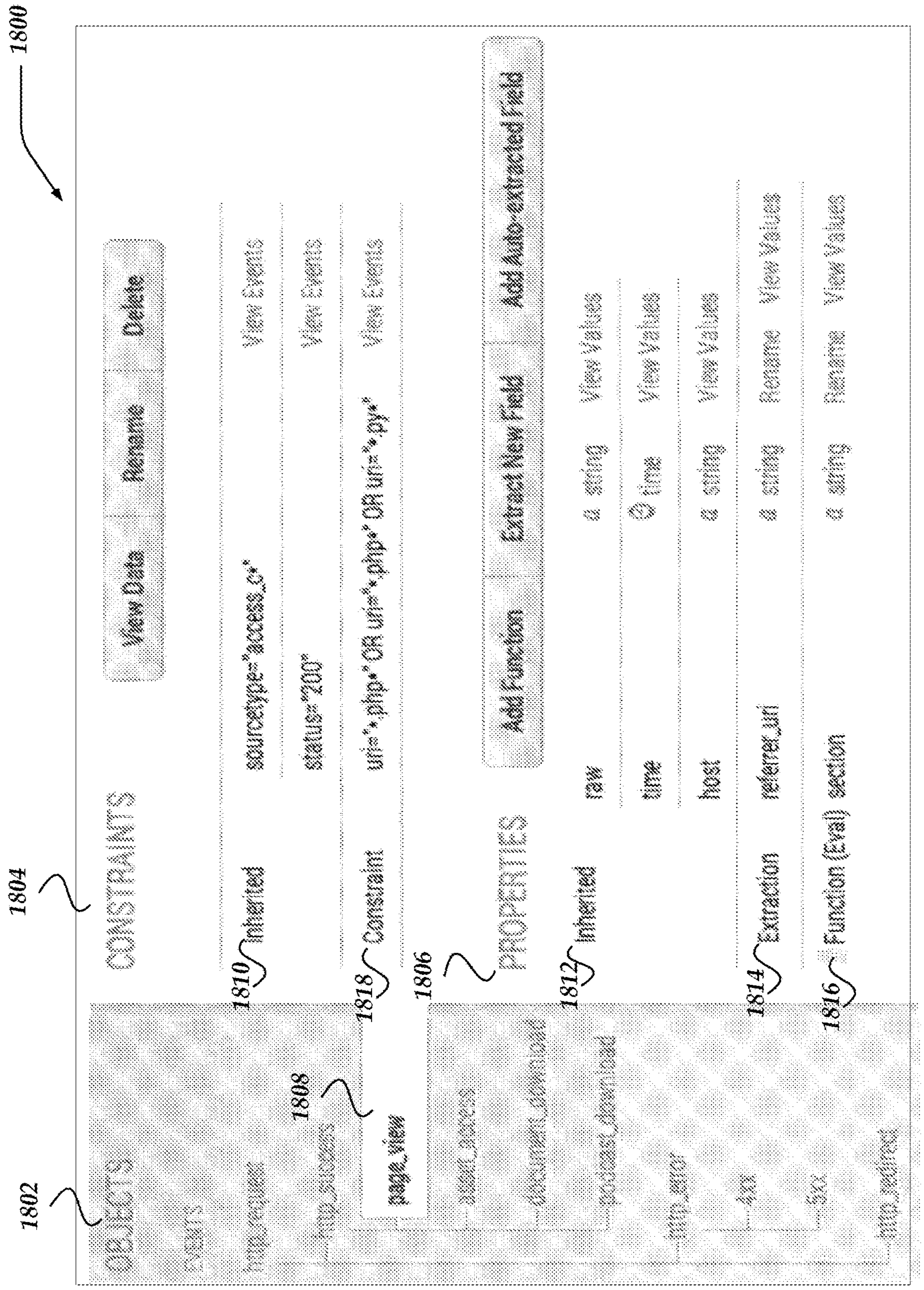
FIG. 18 illustrates a screenshot of a user-interface for at least one of the various embodiments, for editing and/or creating data model objects in a data model.
Figure 19:
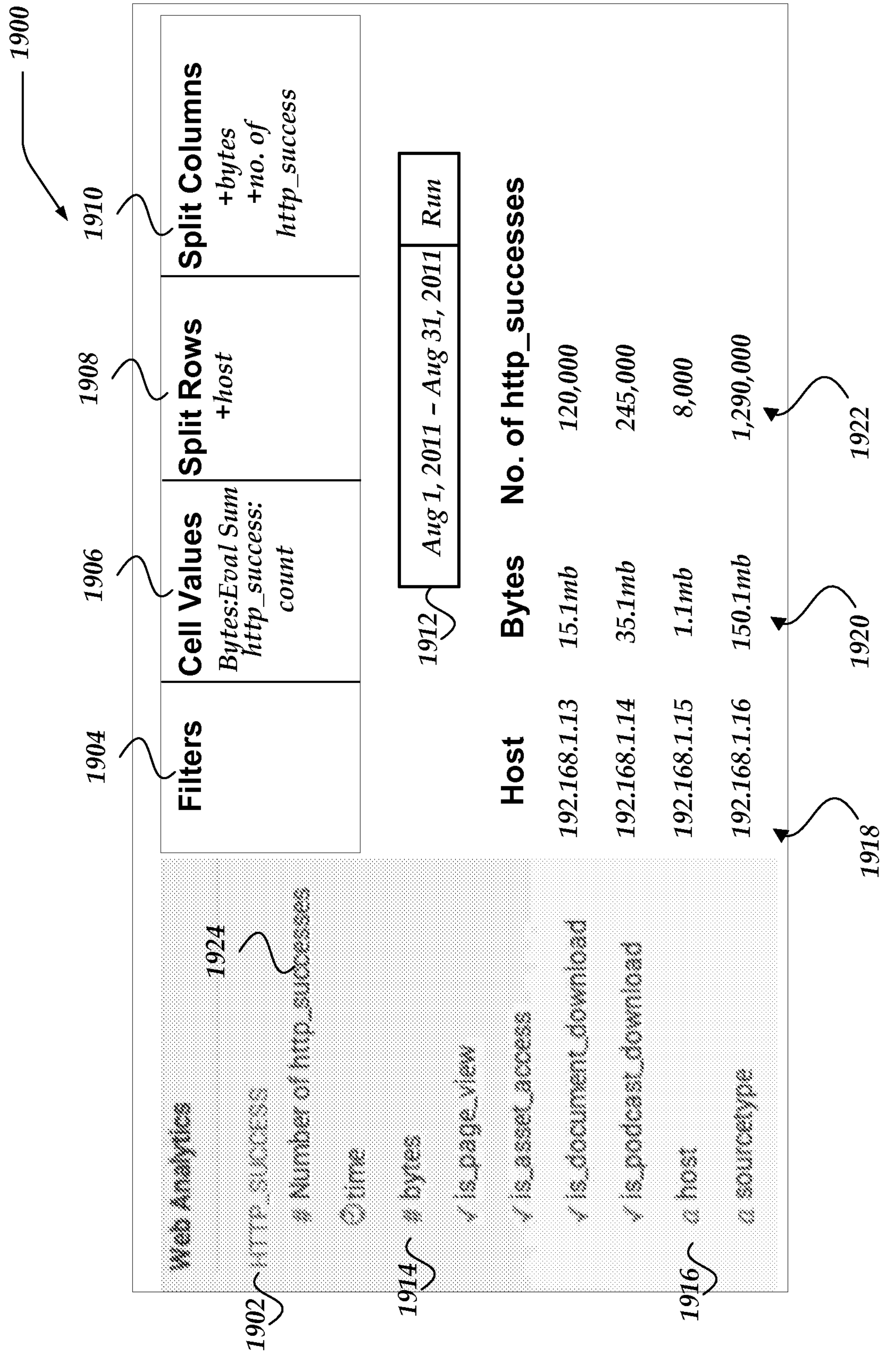
FIG. 19 illustrates a screenshot of a user-interface that may be used for generating pivot reports in accordance with at least one of the various embodiments.

FIGS. 17-19 represent illustrative user-interfaces for at least one of the various embodiments. FIG. 17 illustrates screenshot from at least one of the various embodiments of user-interface 1700 that may be employed for at least viewing a data model. In at least one of the various embodiments, data model objects may be displayed in column 1702. In at least one of the various embodiments, column 1702 may be labeled to indicate the root data model objects in a data model. For example, in at least one of the various embodiments, column 1702 includes data model objects that may be derived from event data model objects and transaction data model objects. Thus, in at least one of the various embodiments, column 1702 may be labeled Events and Transactions.

Also, in at least one of the various embodiments, underneath column 1702 a hierarchical representation of the current data model may be displayed. This display may enable users to quickly grasp the relationships between the various data model objects.

In at least one of the various embodiments, additional columns may be employed to display information about the data model. For example, in at least one of the various embodiments, column 1704 may display a data model object type value corresponding to the root data model object for each listed data model object.

Also, in at least one of the various embodiments, one or more columns may be included that may provide access to relevant operations, such as running report based on the corresponding data model object. For example, in at least one of the various embodiments, column 1706 includes a user-interface (quick report) that may enable users to generate a report directly from the data model viewing user-interface.

One of ordinary skill in the art will appreciate that there may be many variations of user-interfaces for viewing data models and that screenshot 1700 is sufficient to disclose the various embodiments. Also, in at least one of the various embodiments, user-interfaces may include command-line interfaces that enable a user to list, review, or use data models by typing commands at a console.

FIG. 18 illustrates for at least one of the various embodiments a screenshot of user-interface 1800 for at least editing, generating, or creating data model objects in a data model. In at least one of the various embodiments, user-interface 1800 may be arranged into one or more sections, such as object section 1802, constraint section 1804, property section 1806, or the like.

In at least one of the various embodiments, object section 1802 may include a view of the currently selected data model. In at least one of the various embodiments, each data model objects included in the data model may be displayed and/or accessible to the user.

In at least one of the various embodiments, if a user selects a data model object from object section 1802 the data modeling application may generate a display of the details of that data model object. In this example, for at least one of the various embodiments, the selected data model object is page_view 1808. Thus, in this example, the values displayed and/or accessible in the other sections of user-interface 1800 may correspond to data model object page_view 1808.

In at least one of the various embodiments, the data modeling application generates the constraint section 1804 to display the constraints that may be associated with the selected data model object (e.g., page_view 1808). In at least one of the various embodiments, inherited constraints 1810 may be supplied by the parent data model objects of the selected data model object. For example, in at least one of the various embodiments, page_view 1808 is a child of http_success and in turn http_success is a child of http_request. Thus, in at least one of the various embodiments, inherited constraints 1810 may be from either data model object http_request or data model object http_success. Further, in at least one of the various embodiments, user-interface 1800 may enable a user to perform actions and/or operations on constraints, such as, adding constraints, previewing constraints, renaming constraints, deleting constraints, or the like.

In at least one of the various embodiments, constraint 1818 may be associated directly with page_view 1808 rather than being provided by a parent data model object. In at least one of the various embodiments, data model objects may have more or less inherited constraints and direct constraints than depicted in FIG. 18.

In at least one of the various embodiments, properties section 1806 includes the properties that may be associated with the selected data model object (e.g., page_view 1808). In at least one of the various embodiments, properties displayed here may correspond to fields of a data model object. In at least one of the various embodiments, inherited properties 1812 may be supplied by the parent data model objects of the selected data model object. For example, in at least one of the various embodiments, page_view 1808 is a child of http_success and in turn http_success is a child of http_request. Thus, in at least one of the various embodiments, inherited properties 1812 may be from either http_request or http_success. Further, in at least one of the various embodiments, user-interface 1800 may enable a user to perform actions on properties, such as, extracting, previewing, removing, or the like.

In at least one of the various embodiments, extraction property 1814 shows a property that may be associated directly with data model object page_view 1808 rather than being provided by a parent data model object. In at least one of the various embodiments, properties may also include functions or calculations such as Function 1816. In at least one of the various embodiments, data model objects may have more or less inherited properties and direct properties than depicted in FIG. 18.

In at least one of the various embodiments, if a user may be viewing or reporting on an data model object, it may be less important whether a given field definition is inherited from a parent data model object or "owned" by the current data model object. However, in at least one of the various embodiments, for user-interfaces that enable editing of the data model objects, fields that may be owned by the current data model object may be available for edit whereas inherited fields may be treated as read-only. In at least one of the various embodiments, this may apply similarly to constraints, or other inheritable characteristics.

FIG. 19 illustrates user-interface 1900 that may be used for generating pivot reports in accordance with at least one of the various embodiments. In at least one of the various embodiments, users may select data model objects that the data modeling application may employ to generate a pivot report and/or pivot report model. In at least one of the various embodiments, if a data model object may be selected, one or more of the fields (e.g., properties) associated with the data model object may be displayed and/or made available for selection. In at least one of the various embodiments, properties associated with the selected data model object may be selected and added to a pivot report model.

In at least one of the various embodiments, pivot reports may be generated for a defined range of time. In at least one of the various embodiments, a date-time range selector, such as selector 1912 may be employed to determine the relevant data-time range for the pivot report.

For example, in at least one of the various embodiments, data model object 1902 (HTTP_SUCCESS) may be selected. Thus, in at least one of the various embodiments, fields and other properties associated with HTTP_SUCCESS 1902 may be made available to the user. In at least one of the various embodiments, some fields, such as bytes 1914 may be designated as column values for the pivot report. In at least one of the various embodiments, other fields such as host 1916 may be designated as row fields for the pivot report.

In at least one of the various embodiments, if a user initiates the generation a pivot report after selecting a new date-range, the data modeling application may generate a new query string and execute it against the data repository. In other cases, in at least one of the various embodiments, the data modeling application may filter a previously obtained result set using the new data-range.

In at least one of the various embodiments, the column fields and row fields determine the layout of the pivot report. In at least one of the various embodiments, each pivot report may have at least one row and one column.

In at least one of the various embodiments, user-interface 1900 may be a drag-and-drop interface that allows a user to design a pivot report based on a set of properties generated based on the fields on the data model object associated with an underlying data model. In at least one of the various embodiments, user-interface 1900 may define four sections that may comprise the building blocks of a pivot report.

In at least one of the various embodiments, Filters 1904 may be optional restrictions that may be placed on the search results and employed by the data modeling application if a pivot report is generated. For example, in at least one of the various embodiments, users may employ regular expressions to identify and/or remove events where the media type corresponds to an image resource.

In at least one of the various embodiments, cell values 1906 may be employed to determine the operations used to calculate the values for each cell in the report. For example, in at least one of the various embodiments, the user and/or data modeling application may determine that the cell value should include the count of all page views events. As illustrated in user-interface 1900, in at least one of the various embodiments, cell values include the sum of the field "bytes" 1920 and the count of field "http_successes" 1922.

In at least one of the various embodiments, split rows 1908 may be employed to determine how the rows of the pivot report may be split up. For example, in at least one of the various embodiments, user-interface 1900 may employ host field 1916 as a split row which results in rows 1918 in the pivot report corresponding to each unique value for included in the host field.

In at least one of the various embodiments, split columns 1910 may be employed to determine how the columns in the pivot report may be divided. For example, in at least one of the various embodiments, bytes field 1916 and number of http_successes field 1924 may be selected as split columns for pivot report 1900.

Illustrative Data Modeling Code

FIGS. 20-21 represents data modeling programming code illustrative of at least one of the various embodiments. FIG. 20 includes a code listing of data model object 2000 that implements at least a portion of a pivot report template. In at least one of the various embodiments, pivot report template 2000 may be implemented using various computer programming languages, such as, C, C++, Perl, Python, Java, JavaScript, or the like. For example, pivot report model 2000, as shown is implemented in JavaScript Object Notation (JSON).

In at least one of the various embodiments, the base class in this example pivot report template may be "ApacheAccessSearch" 2002. Likewise, in at least one of the various embodiments, each pivot report template may include an attribute that indicates the data model that the report model may be associated with. For example, in at least one of the various embodiments, pivot report model 2000 may be included in data model WebIntelligence as indicated by attribute 2004.

In at least one of the various embodiments, filters 2006 may be an array or list of filters that may be included in a pivot report template. Further, in at least one of the various embodiments, cells 2008 may be an array or list of cell value definitions for a pivot report template. Also, in at least one of the various embodiments, rows 2010 may be an array or list that may include the split rows for a pivot report. In at least one of the various embodiments, columns 2012 may be an array or list that may include the split columns for a pivot report.

FIG. 21 includes a code listing of a portion of a data model 2100 in accordance with at least one of the various embodiments. In at least one of the various embodiments, data model 2100 may be implemented in various computer programming languages, such as, C, C++, Perl, Python, Java, JavaScript, or the like. For example, data model 2100 is implemented in Python.

In at least one of the various embodiments, a data model implementation may define one or more data model objects. In at least one of the various embodiments, each data model object may have a defined parent data model object and a set of fields. For example, in at least one of the various embodiments, data model object 2102 is a portion of computer programming code that may define a data model object of HTTP_Request that has a parent object of Event. Further, in at least one of the various embodiments, data model object 2102 defines fields for HTTP_Request, including uri, clientip, and referrer.

For example, in at least one of the various embodiments, additional data model objects may be defined including, HTTP_Success 2104 (a child of HTTP_Request 2102), HTTP_Error 2106 (a child of HTTP_Request 2102), HTTP_Redirect 2108 (a child of HTTP_Request), Page View 2110 (a child of HTTP_Success 2108).

In at least one of the various embodiments, if an object oriented programming language such as, Python, C++, JavaScript, or the like, may be employed. In at least one of the various embodiments, one or more native object oriented programming features of the programming language may be employed to implement/support the object oriented characteristics of the data models, such as, parent-child relationships between data model objects. Otherwise, in at least one of the various embodiments, if non-object oriented languages may be employed, such as, C, Perl, or the like, well-known programming techniques may be employed to implement sufficient object-oriented functionality.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Furthermore, it will be understood that for at least one of the various embodiments, various types of data may be received and processed as described and claimed herein. And, at least one of the various embodiments is not limited to processing machine data.

What is claimed is:

1. A computer-implemented method, comprising:

generating a result set from data stored in a data repository using a query string, wherein the data stored in the data repository comprises a plurality of time-stamped, searchable events including a portion of unstructured raw machine data reflecting activity in an information technology environment;

determining a plurality of candidate data model object fields based upon the result set;

generating groupings for the plurality of candidate data model object fields based upon at least one field commonality among the plurality of candidate data model object fields of the result set; and generating, using the result set from the query string, a data model that defines semantic meaning for at least a portion of the data stored in the data repository, that is maintained in an unmodified form, based upon the groupings for the plurality of candidate data model object fields determined based on the result set corresponding with the query string.

2. The computer-implemented method of claim 1, wherein determining the plurality of candidate data model object fields comprises causing a graphical user interface to be displayed that includes a list of candidate data model object fields, wherein the plurality of candidate data model object fields are selected from the list of candidate data model object fields via the graphical user interface.

3. The computer-implemented method of claim 1, wherein determining the plurality of candidate data model object fields comprises identifying a plurality of candidate field names in an unstructured data record corresponding to the result set.

4. The computer-implemented method of claim 1, wherein generating the data model based upon the groupings for the plurality of candidate data model object fields comprises iteratively modifying the groupings or the plurality of candidate data model object fields.

5. The computer-implemented method of claim 1, wherein determining the groupings of the plurality of candidate data model object fields comprises identifying records in the result set having at least one common field.

6. The computer-implemented method of claim 1, wherein determining the groupings of the plurality of candidate data model object fields comprises mapping at least one common field in the plurality of candidate data model object fields to a field in the data model.

7. The computer-implemented method of claim 1, further comprising identifying a parent-child relationship between records in the result set having one or more fields in common, wherein the parent-child relationship between the records is mapped to a field in the data model.

8. The computer-implemented method of claim 1, wherein determining the groupings of the plurality of candidate data model object fields comprises identifying a plurality of records associated with a single information technology event in the result set.

9. The computer-implemented method of claim 1, wherein generating the result set comprises identifying results based upon a report template and determining the plurality of candidate data model object fields based upon the result set comprises mapping the result set for a plurality of fields specified in the report template.

10. One or more non-transitory computer readable media storing instructions that, when executed by one or more processors, cause the one or more processors to perform steps of:

generating a result set from data stored in a data repository using a query string, wherein the data stored in the data repository comprises a plurality of time-stamped, searchable events including a portion of unstructured raw machine data reflecting activity in an information technology environment;

determining a plurality of candidate data model object fields based upon the result set;

generating groupings for the plurality of candidate data model object fields based upon at least one field commonality among the plurality of candidate data model object fields of the result set; and generating, using the result set from the query string, a data model that defines semantic meaning for at least a portion of the data stored in the data repository, that is maintained in an unmodified form, based upon the groupings for the plurality of candidate data model object fields determined based on the result set corresponding with the query string.

11. The one or more non-transitory computer readable media of claim 10, wherein determining the plurality of candidate data model object fields comprises causing a graphical user interface to be displayed that includes a list of candidate data model object fields, wherein the plurality of candidate data model object fields are selected from the list of candidate data model object fields via the graphical user interface.

12. The one or more non-transitory computer readable media of claim 10, wherein determining the plurality of candidate data model object fields comprises identifying a plurality of candidate field names in an unstructured data record corresponding to the result set.

13. The one or more non-transitory computer readable media of claim 10, wherein determining the groupings of the plurality of candidate data model object fields comprises identifying records in the result set having at least one common field.

14. The one or more non-transitory computer readable media of claim 10, wherein determining the groupings of the plurality of candidate data model object fields comprises mapping at least one common field in the plurality of candidate data model object fields to a field in the data model.

15. The one or more non-transitory computer readable media of claim 10, further comprising identifying a parent-child relationship between records in the result set having one or more fields in common, wherein the parent-child relationship between the records is mapped to a field in the data model.

16. The one or more non-transitory computer readable media of claim 10, wherein generating the result set comprises identifying results based upon a report template and determining the plurality of candidate data model object fields based upon the result set comprises mapping the result set for a plurality of fields specified in the report template.

17. The one or more non-transitory computer readable media of claim 10, further comprising generating a pivot report based upon the result set and the data model, wherein the data model specifies a cell calculation extracted from a report template.

18. A computer system, comprising:

one or more memories; and one or more processors for:

generating a result set from data stored in a data repository using a query string, wherein the data stored in the data repository comprises a plurality of time-stamped, searchable events including a portion of unstructured raw machine data reflecting activity in an information technology environment;

determining a plurality of candidate data model object fields based upon the result set;

generating groupings for the plurality of candidate data model object fields based upon at least one field commonality among the plurality of candidate data model object fields of the result set; and generating, using the result set from the query string, a data model that defines semantic meaning for at least a portion of the data stored in the data repository, that is maintained in an unmodified form, based upon the groupings for the plurality of candidate data model object fields determined based on the result set corresponding with the query string.

* * * * *